United States Patent
Gal et al.

(10) Patent No.: US 12,272,166 B2
(45) Date of Patent: Apr. 8, 2025

(54) SYSTEM, METHOD AND COMPUTER PROGRAM PRODUCT FOR MITIGATING CUSTOMER ONBOARDING RISK

(71) Applicant: AU10TIX LTD., Hod Hasharon (IL)

(72) Inventors: Ronen Gal, Shilat (IL); Shai Litvak, Beit Hashmonai (IL); Gabriel Kozakov, Kfar Saba (IL); Jakob Avitan, Moshav Tkuma (IL); Ron Atzmon, Tel Aviv (IL)

(73) Assignee: AU10TIX LTD., Hod Hasharon (IL)

( * ) Notice: Subject to any disclaimer, the term of this patent is extended or adjusted under 35 U.S.C. 154(b) by 0 days.

(21) Appl. No.: 17/317,392

(22) Filed: May 11, 2021

(65) Prior Publication Data

US 2021/0351927 A1 Nov. 11, 2021

Related U.S. Application Data

(60) Provisional application No. 63/107,285, filed on Oct. 29, 2020, provisional application No. 63/022,606, filed on May 11, 2020.

(51) Int. Cl.
*G06V 30/40* (2022.01)
*G06F 21/62* (2013.01)
(Continued)

(52) U.S. Cl.
CPC .......... *G06V 30/40* (2022.01); *G06F 21/6245* (2013.01); *H04L 9/32* (2013.01);
(Continued)

(58) Field of Classification Search
None
See application file for complete search history.

(56) References Cited

U.S. PATENT DOCUMENTS

| | | |
|---|---|---|
| 6,141,438 A | 10/2000 | Blanchester |
| 9,081,988 B2 | 7/2015 | Dolev |

(Continued)

FOREIGN PATENT DOCUMENTS

| | | | |
|---|---|---|---|
| WO | 2011/058554 A1 | 5/2011 | |
| WO | 2020/089907 A1 | 5/2020 | |
| WO | WO-2021031523 A1 * | 2/2021 | ......... G06K 9/00382 |

OTHER PUBLICATIONS

Berenguel, A., Terrades, O. R., Llados, J., & Cañero, C. "e-Counterfeit: a mobile-server platform for document counterfeit detection." 2017 14th IAPR International Conference on Document Analysis and Recognition (ICDAR), (Nov. 2017), (vol. 9, pp. 15-20). IEEE.

(Continued)

*Primary Examiner* — Alexander Lagor
*Assistant Examiner* — Felicia Farrow
(74) *Attorney, Agent, or Firm* — Oliff PLC

(57) ABSTRACT

A data analytics system/method operative in conjunction with a data repository storing data regarding each of a multiplicity of frames including images of ID documents, including receiving at least one image generated by an image capturing device such as a camera or scanner; providing document data, derived by a hardware processor from the image capturing device, which characterizes a document depicted in the image; providing person data, derived by a hardware processor from the image, which characterizes a person who may bear the document depicted in the image; and generating inputs for identification of potential fraudulent attempts including analyzing whether the document data exists within the data regarding each of the multiplicity of images of ID documents; and/or analyzing whether the person data exists within the data regarding each of the multiplicity of images of ID documents.

19 Claims, 8 Drawing Sheets

| ID VERIFICATION | QUERY | COMPARISON | RESPONSE | STORE |
|---|---|---|---|---|
|  |  |  |  |  |
| Documents sent to ID Verification Process (BOS) | Document query sent to Instinct Repository for new detections: repetitions and conflicts | Detection of repetitions and conflicts based on existing stored data hash | Results provided by same JSON file, 1 API more protection | Hashed and stored for future queries, enabling perpetual velocity checks |

(51) Int. Cl.
*G06V 30/413* (2022.01)
*G06V 40/16* (2022.01)
*G06V 40/50* (2022.01)
*H04L 9/32* (2006.01)

(52) U.S. Cl.
CPC .......... *G06V 30/413* (2022.01); *G06V 40/166* (2022.01); *G06V 40/50* (2022.01)

(56) References Cited

U.S. PATENT DOCUMENTS

| | | | |
|---|---|---|---|
| 9,406,030 B2 | 8/2016 | Dolev et al. | |
| 10,467,491 B2 | 11/2019 | Markin et al. | |
| 2004/0213437 A1* | 10/2004 | Howard | G06F 16/93 707/999.009 |
| 2006/0157559 A1 | 7/2006 | Levy et al. | |
| 2015/0341370 A1* | 11/2015 | Khan | H04L 63/20 726/30 |
| 2021/0065355 A1 | 3/2021 | Atzmon et al. | |
| 2021/0075788 A1* | 3/2021 | Pasterk | G06F 16/532 |
| 2021/0124919 A1* | 4/2021 | Balakrishnan | G06V 30/418 |
| 2021/0343030 A1* | 11/2021 | Sagonas | G06T 7/30 |

OTHER PUBLICATIONS

Kaur, P., Krishan, K., Sharma, S. K., & Kanchan, T. "Facial-recognition algorithms: A literature review." Medicine, Science and the Law, (2020), 60(2), 131-139.

Zhao, Z. Q., Zheng, P., Xu, S. T., & Wu, X. "Object Detection with Deep Learning: A Review." IEEE Transactions on Neural Networks and Learning Systems, (2019), 30(11), 3212-3232.

Rawat, W., & Wang, Z. "Deep Convolutional Neural Networks for Image Classification: A Comprehensive Review." Neural computation, (2017), 29(9), 2352-2449.

<https://opencv.org/>, May 2, 2021.

<https://docs.opencv.org/3.4/d4/d93/group_img_hash.html>, Feb. 26, 2021.

Instinct—A new analytics Platform, Introduction, Feb. 2020.

* cited by examiner

Fig. 2A

| Value | Description |
|---|---|
| All | Counts data repetitions results for all data.<br>    Repetitions are counted for these time frames<br>    CountAll – all historical data<br>    CountDay – last 24 hours<br>    CountHour – last hour<br>    Counters time are based on the ProcessingStartTime field.<br>SeenThatDocumentNumber<br>A document number is a unique combination of Country, State, Document Type and Document Number.<br>Document *Info* Fields are<br>    FirstName<br>    MiddleName<br>    LastName<br>    FullName<br>    DateOfBirth<br>    FaceId<br>• IndConflict - gets TRUE when all the id fields are equals (Country +State+ DocumentType+ DocumentNumber) and one of the *info* fields values are different from the values that are stored in the Instinct historical DB.<br>SeenThatPerson<br>A person is a unique combination of Country, First Name, Last Name, Full Name and Date Of Birth.<br>Person *Info* Fields are<br>    Doc type+ doc number<br>    Face Identifier<br>• IndConflict - gets TRUE when all the fields are equal using (Country +FirstName+ LastName+ FullName+Date of birth+document type) and one of the info fields values are different from the values that are stored in the Instinct DB.<br>SeenThatGeolocation<br>A geolocation is a unique geo location with a unique Latitude and Longitude value.<br>SeenThatImageTemplate<br>Image Template *Info* Fields are<br>    MiddleName<br>    LastName<br>    FullName<br>    DateOfBirth<br>    FaceId |

Fig. 2B

| Value | Description |
|---|---|
| | |
| MyOrganization | Counts data repetitions results for the specific organization historical data.<br>    Repetitions are counted for these time frames<br>    CountAll – all historical data<br>    CountDay – last 24 hours<br>    CountHour – last hour<br><br>    counters time are based on the ProcessingStartTime field.<br><br>SeenThatDocumentNumber<br>A document number is a unique combination of Country, State, Document Type and Document Number.<br>Document *Info* Fields are<br>    FirstName<br>    MiddleName<br>    LastName<br>    FullName<br>    DateOfBirth<br><br>• IndConflict - gets TRUE when all the id fields are equals (Country +State+ DocumentType+ DocumentNumber) and one of the *info* fields values are different from the values that are stored in the historical DB.<br><br>SeenThatPerson<br>A person is a unique combination of Country, First Name, Last Name and Date Of Birth.<br>• IndConflict - gets TRUE when all the fields are equal using (Country +FirstName+ LastName+ Date of birth+document type) and one of the info fields values are different from the values that are stored in the DB.<br><br>SeenThatGeolocation<br>A geolocation is a unique geo location with a unique Latitude and Longitude value. |

SYSTEM, METHOD AND COMPUTER PROGRAM PRODUCT FOR MITIGATING CUSTOMER ONBOARDING RISK

REFERENCE TO CO-PENDING APPLICATIONS

Priority is claimed from U.S. Ser. No. 63/022,606 filed 11 May 2020 and entitled "System, Method And Computer Program Product For Mitigating Customer Onboarding" and from U.S. Ser. No. 63/107,285 filed 29 Oct. 2020 and entitled "System, Method and Computer Program Product For Authentication Of Digital Service End-Users". The disclosures of these applications are hereby incorporated by reference.

FIELD OF THIS DISCLOSURE

The present invention relates generally to services provided to end-users via a computer network, and more particularly to security of services provided to end-users via a computer network.

BACKGROUND FOR THIS DISCLOSURE

Traditional identity fraud involves a fraudster assuming the identity of a real person. Traditional identity fraud is usually reported quickly, either by ID verification services, or by the real victim. In contrast, synthetic fraudsters typically create a synthetic i.e. non-real identity for themselves which may include a real social security number, such as that of a child, coupled to fictitious data such as a name, driver's license or street address, which do not belong to the child. False identification documents may be used.

The disclosures of all publications and patent documents mentioned in the specification, and of the publications and patent documents cited therein directly or indirectly, are hereby incorporated by reference, other than subject matter disclaimers or disavowals. If the incorporated material is inconsistent with the express disclosure herein, the interpretation is that the express disclosure herein describes certain embodiments, whereas the incorporated material describes other embodiments. Definition/s within the incorporated material may be regarded as one possible definition for the term/s in question.

SUMMARY OF CERTAIN EMBODIMENTS

It is appreciated that the term "hash" as used herein is but one example of an encryption function suitable to implement functionality described herein and alternatively, other encryption functions may be employed. The term BOS is used herein merely as an example of an onboarding automation system typically having all or any subset of the following capabilities: authentication and/or content retrieval and/or verification/screening (KYC/AML). The term JSON as used herein is merely an example of one suitable data format which may be used as a data interchange format for web applications and web services and which typically provides metadata about data and/or is configured to enforce data structure standards while, typically, also allowing flexibility to break rules, and/or may be used for mass data transfer. Any suitable alternative such as but not limited to XML, YAML, Protobuf, Avro, MongoDB, CosmosDB, and OData may be employed.

Certain embodiments seek to provide an adaptive analytics and data platform that detects identity risk and/or mitigates customer onboarding risk, typically based on historical behaviors, emerging patterns and facts. Processing typically occurs inside the closed system, and typically compares hashed values to hashed values.

Certain embodiments seek to provide a platform to minimize risk of fraud perpetrated on system users by their end-users (aka platform users aka service providers) and/or to maximize secure onboarding of end-users by the system users, assuming that system users' end users are remote end-users, typically equipped with a camera e.g. a smartphone camera, with whom the server of each system user may communicate only via a network e.g. because the remote end-users are not customer-present (are, say, at home, or at work, or on the move, rather than being in a brick-and-mortar trusted facility serviced by personnel co-located with the end-user and trusted by the system user serving the end-user, wherein authentication of end-users is based on images of the end-users' ID documents, which are acquired by imagers, e.g. smartphone cameras, possessed by end-users.

Certain embodiments seek to provide an authentication system comprising a platform enabling system users which provide services to the users' respective customers, to collaborate in preventing fraud perpetrated against the users, the platform including comparison of customer-imaged identity document images to identity document data stored in the system; and a user interface allowing system users to define alerts derived from the comparisons. The comparison may include generated a numerical representation of the customer-imaged identity documents for comparison with numerical representations generated from document data stored in the system, which may include numerical representations of customer-imaged identity documents encountered in the past.

Alerts may include repetitions of at least one feature and/or may include conflicts.

The comparison may include hashing the customer-imaged document thereby to yield a customer hash and comparing the customer hash to document data which includes hashes of documents previously presented by customers.

The term "Instinct" is used herein as shorthand for any embodiment of the system shown, described, or illustrated herein.

Outputs typically include risk indicators generated by this comparison. Any suitable technology may be used for alerting of risks which may indicate misuse of government ID's, such as but not limited to presentation on a display screen.

Typically, users subscribed to an online ID authentication service having an API may avail themselves of an API element termed herein "DataAnalyticsReport" which provides repetition counters and/or conflict indications e.g. for all or any subset of the following use cases or seen-that elements:

have I seen this document number before?
have I seen this person before?
have I seen this geographical location before?
have I seen this image template before?
have I seen this face picture before?
have I seen this address before?
AttackInfo
  Attack Size and/or
  Attack Quality and/or
  Attack Magnitude According to certain embodiments, the system of the present invention provides data regarding all or any subset of the above 7 elements.

Each repetition counter may count instances of each use case searched entity or seen-that element (e.g. all or any subset of: document number, person, geolocation, image template, face picture, address) in the Instinct data repository. A repetition (plural instances of a seen-that element e.g.) may be indicative of document abuse e.g. fraud or forgery.

It is appreciated that description herein of Geolocation repetition is not only applicable to repetition of geolocation specifically, and is also applicable to "Have I seen this address before?".

A (typically Boolean) conflict indication may be raised when current documents conflict with historical data that exists in Instinct's data repository.

A document number may be defined as a unique combination identifying a given document bearer e.g. may include (all or any subset of) the document country and state (if applicable)+document type+document number.

A person may be defined as a unique combination of alpha-numerical data identifying a given document bearer e.g. may include of (all or any subset of) country+first name+last name (of full name when applicable)+date of birth.

Typically, comparisons "match" only where values are identical (exact spelling match). Thus, John Smith would not match Jon Smyth, for example.

The country data may store an indication of the document issuing country, not the geographical location where the image of the document was taken or uploaded.

Geolocation is typically a unique combination of latitude and longitude extracted from an image meta source when applicable/available.

If image meta source does not include the geolocation information, Instinct may skip counting the geolocation repetition counter.

An image template may be defined as a analytic function of the visual elements on the document, that includes the document background and/or items that exist on the image other than the document bearer's photograph.

A face may be defined as a numerical representation of the face.

An address may be defined as exact street address that exists on the documents.

Attack Info may be defined as a set of documents that are deemed to belong to the same hostile attack because they share all or any subset of the same identifiers such as, for example:
 Same faces
 Same image templates
 Same Person
 Same Document number Typically, Instinct performs its comparison query only on valid values (not missing and readable). When one of the comparison values is missing or unreadable, Instinct may skip the comparison e.g. to avoid false positive alerts.

Typically, the service aka Instinct aggregates repetition counters into plural time frames e.g. all or a subset of the following:
 1. last hour—number of occurrences in the last 60 minutes
 2. last day—number of occurrences in the last 24 hours
 3. All data—all historical data that the Instinct data repository holds for this document entities, which may use Instinct's "transaction start datetime" (time when the doc verification service started the verification process) as the reference or starting date.

It is appreciated that attacks often include an unusual number of repetitions within a short time period e.g. within an hour or day. If an alert is generated after, say, 7 or 10 ID documents are presented with the same template and/or the same person data and/or the same photograph, then the attack is thwarted, both because the attacker cannot continue presenting dozens or hundreds of ID document images with the same template and/or the same person data and/or the same photograph, which s/he would, absent the system shown and described herein, be free to do, and because even the document images, which have already entered the system, can be marked with an alert.

Instinct service may, selectably, compare a current document's data with repetitions and conflicts either only for the specific organization handling this current document, or, for all subscribed organizations who have opted in.

Typically, end users cannot see conflicted data. Instinct does not reply to the actual conflicted values, when alerting for conflict, and typically does not save conflicting plain or textual sensitive data. Typically, Instinct does not save any images.

When the Instinct service is activated, the system may retain hashed signals from the BOS authentication results, Typically, analysis performed for a customer who has enrolled to the service, may be shared with organization b if the same ID is submitted by a and by b, but without disclosing actual personal data, origin thereof, or any identifiable information related to the customer.

It is appreciated that any processing herein may be performed locally and/or on a remote server or cloud service.

Data may be stored under one or more layers of encryption, ensuring that confidential customer data cannot be derived from any disclosed data.

According to certain embodiments, an API service is provided that allows subscribed customers to pull their data from the Instinct data repository for downstream applications. Typically, all pulled PII data that the API provides, is hashed. According to certain embodiments, the API response for subscribed customers includes a DataAnalyticsReport with JSON high level elements which may include SeenThat elements e.g. as described below.

Certain embodiments of the present invention seek to provide circuitry typically comprising at least one processor in communication with at least one memory, with instructions stored in such memory executed by the processor to provide functionalities which are described herein in detail. Any functionality described herein may be firmware-implemented or processor-implemented, as appropriate.

It is appreciated that any reference herein to, or recitation of, an operation being performed is, e.g. if the operation is performed at least partly in software, intended to include both an embodiment where the operation is performed in its entirety by a server A, and also to include any type of "outsourcing" or "cloud" embodiments in which the operation, or portions thereof, is or are performed by a remote processor P (or several such), which may be deployed off-shore or "on a cloud", and an output of the operation is then communicated to, e.g. over a suitable computer network, and used by, server A. Analogously, the remote processor P may not, itself, perform all of the operations, and, instead, the remote processor P itself may receive output/s of portion/s of the operation from yet another processor/s may be deployed off-shore relative to P, or "on a cloud", and so forth.

There are thus provided, at least the following embodiments:

Embodiment 1. A data analytics method operative in conjunction with a data repository storing data regarding each of a multiplicity of frames including images of ID documents or more generally, document images, the method comprising all or any subset of the following operations: receiving at least one image typically captured by a camera, scanner or other image capturing device; and/or providing document data, which may be derived by a hardware processor from the image capturing device, wherein the document data characterizes a document depicted in the image; and/or providing person data, derived by a hardware processor from the image, which characterizes a person who may bear the document depicted in the image; and/or generating inputs for identification of potential fraudulent attempts typically including at least one of: analyzing whether the document data exists within the data regarding each of the multiplicity of images of ID documents; and/or analyzing whether the person data exists within the data regarding each of the multiplicity of images of ID documents.

Embodiment 2. The method according to any of the preceding embodiments and also comprising providing geolocation data, characterizing the image capturing device, and wherein the data repository also includes geolocation data for at least some of the ID documents in the multiplicity of images.

Embodiment 3. The method according to any of the preceding embodiments wherein the generating inputs also comprises analyzing whether the geolocation data exists within the data regarding each of the multiplicity of images of ID documents.

Embodiment 4. The method according to any of the preceding embodiments wherein the providing geolocation data derived from the image comprises deriving the geolocation data from the image.

Embodiment 5. The method according to any of the preceding embodiments wherein at least some of the data regarding each of the multiplicity of images is time-stamped and wherein the analyzing includes determining how many of at least one of the document data and the person data exist within a given window of time,
wherein at least some of the data regarding each of the multiplicity of images is time-stamped and wherein the analyzing includes determining how many of at least one of the document data and the person data exist within each of plural windows of time.

Embodiment 6. The method according to any of the preceding embodiments wherein the method is operative in conjunction with plural data repositories storing respective multiplicities of images of ID documents and wherein the generating input comprises analyzing whether certain data exists within a set of images, including more than one of the multiplicities of images of ID documents, and wherein images stored in a given repository from among the plural repositories is included in the set only if an end-user of the method, associated with the given repository, authorizes inclusion of the images in the given repository in the set.

Embodiment 7. The method according to any of the preceding embodiments wherein data regarding each of the images in the set has been encrypted, by applying a encryption function, thereby to provide encrypted data regarding each of the images in the set, and wherein the analyzing whether certain data, D, derived from a received image, which exists within the set of images, includes applying the hash function to data D, thereby to provide encrypted data D, and comparing the encrypted data D to the encrypted data regarding each of the images in the set, thereby to yield analytics which is collaborative between the plural repositories, yet preserves privacy of data in the repositories.

Embodiment 8. The method according to any of the preceding embodiments wherein the providing document data derived from the image comprises deriving the document data from the image.

Embodiment 9. The method according to any of the preceding embodiments wherein the providing person data derived from the image comprises deriving the person data from the image.

Embodiment 10. A system comprising at least one hardware processor configured to carry out the operations of any of the methods of embodiments 1-9 or a computer program product, comprising a non-transitory tangible computer readable medium having computer readable program code embodied therein, the computer readable program code adapted to be executed to implement any method herein e.g. any of the methods of embodiments 1-9.

Embodiment 11. An ID document authentication system serving system users having remote, non-present end-users, the system comprising:
a platform communicating with system users via a communication network, which receives ID document images provided to the system users by the system users' remote, non-present end-users who captured or acquired the images using imagers such as smartphone cameras or scanners,
digital memory which stores data indicative of the ID document images so received; and
a hardware processor configured to compare at least one incoming ID document image to the data in the digital memory, including determining whether at least one characteristic of the incoming ID document image is a seen-before characteristic because the characteristic is to be found within the data in the digital memory; and to generate an alert for at least one incoming ID document image which has at least one seen-before characteristic.

Embodiment 12. The system according to any of the preceding embodiments wherein the seen-before characteristic comprises a photograph of a face within in the incoming ID document image.

Embodiment 13. The system according to any of the preceding embodiments wherein the seen-before characteristic comprises an ID document identifier OCRed from the incoming ID document image.

Embodiment 14. The system according to any of the preceding embodiments wherein the seen-before characteristic comprises personal information OCRed from the incoming ID document image.

Embodiment 15. The system according to any of the preceding embodiments wherein the seen-before characteristic comprises an ID document identifier OCRed from the incoming ID document image.

Embodiment 16. The system according to any of the preceding embodiments wherein the seen-before characteristic comprises a template of the incoming ID document image, which includes only portions of the incoming ID document image which are common to plural ID documents held by plural respective bearers.

Embodiment 17. The system according to any of the preceding embodiments wherein the seen-before characteristic comprises a template of the incoming ID document image, which includes portions of the incoming ID document image other than the incoming ID document itself, aka background portions of the incoming ID document image.

Also provided, excluding signals, is a computer program comprising computer program code means for performing any of the methods shown and described herein when the program is run on at least one computer; and a computer program product, comprising a typically non-transitory computer-usable or -readable medium e.g. non-transitory computer-usable or -readable storage medium, typically tangible, having a computer readable program code embodied therein, the computer readable program code adapted to be executed to implement any or all of the methods shown and described herein. The operations in accordance with the teachings herein may be performed by at least one computer specially constructed for the desired purposes, or a general purpose computer specially configured for the desired purpose by at least one computer program stored in a typically non-transitory computer readable storage medium. The term "non-transitory" is used herein to exclude transitory, propagating signals or waves, but to otherwise include any volatile or non-volatile computer memory technology suitable to the application.

Any suitable processor/s, display and input means may be used to process, display e.g. on a computer screen or other computer output device, store, and accept information such as information used by or generated by any of the methods and apparatus shown and described herein; the above processor/s, display and input means including computer programs, in accordance with all or any subset of the embodiments of the present invention. Any or all functionalities of the invention shown and described herein, such as but not limited to operations within flowcharts, may be performed by any one or more of: at least one conventional personal computer processor, workstation or other programmable device or computer or electronic computing device or processor, either general-purpose or specifically constructed, used for processing; a computer display screen and/or printer and/or speaker for displaying; machine-readable memory such as flash drives, optical disks, CDROMs, DVDs, BluRays, magnetic-optical discs or other discs; RAMs, ROMs, EPROMs, EEPROMs, magnetic or optical or other cards, for storing, and keyboard or mouse for accepting. Modules illustrated and described herein may include any one or combination or plurality of: a server, a data processor, a memory/computer storage, a communication interface (wireless (e.g. BLE) or wired (e.g. USB)), and a computer program stored in memory/computer storage.

The term "process" as used above is intended to include any type of computation or manipulation or transformation of data represented as physical, e.g. electronic, phenomena which may occur or reside e.g. within registers and/or memories of at least one computer or processor. Use of nouns in singular form is not intended to be limiting; thus the term processor is intended to include a plurality of processing units which may be distributed or remote, the term server is intended to include plural typically interconnected modules running on plural respective servers, and so forth.

The above devices may communicate via any conventional wired or wireless digital communication means, e.g. via a wired or cellular telephone network, or a computer network such as the Internet.

The apparatus of the present invention may include, according to certain embodiments of the invention, machine readable memory containing or otherwise storing a program of instructions which, when executed by the machine, implements all or any subset of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program, such as but not limited to a general purpose computer which may optionally be configured or activated in accordance with the teachings of the present invention. Any of the teachings incorporated herein may, wherever suitable, operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless stated otherwise, terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining", "providing", "accessing", "setting" or the like, refer to the action and/or processes of at least one computer/s or computing system/s, or processor/s or similar electronic computing device/s or circuitry, that manipulate and/or transform data which may be represented as physical, such as electronic, quantities e.g. within the computing system's registers and/or memories, and/or may be provided on-the-fly, into other data which may be similarly represented as physical quantities within the computing system's memories, registers or other such information storage, transmission or display devices or may be provided to external factors e.g. via a suitable data network. The term "computer" should be broadly construed to cover any kind of electronic device with data processing capabilities, including, by way of non-limiting example, personal computers, servers, embedded cores, computing system, communication devices, processors (e.g. digital signal processor (DSP), microcontrollers, field programmable gate array (FPGA), application specific integrated circuit (ASIC), etc.) and other electronic computing devices. Any reference to a computer, controller or processor is intended to include one or more hardware devices e.g. chips, which may be co-located or remote from one another. Any controller or processor may for example comprise at least one CPU, DSP, FPGA or ASIC, suitably configured in accordance with the logic and functionalities described herein.

Any feature or logic or functionality described herein may be implemented by processor/s or controller/s configured as per the described feature or logic or functionality, even if the processor/s or controller/s are not specifically illustrated for simplicity. The controller or processor may be implemented in hardware, e.g., using one or more Application-Specific Integrated Circuits (ASICs) or Field-Programmable Gate Arrays (FPGAs), or may comprise a microprocessor that runs suitable software, or a combination of hardware and software elements.

The present invention may be described, merely for clarity, in terms of terminology specific to, or references to, particular programming languages, operating systems, browsers, system versions, individual products, protocols and the like. It will be appreciated that this terminology or such reference/s is intended to convey general principles of operation clearly and briefly, by way of example, and is not intended to limit the scope of the invention solely to a particular programming language, operating system, browser, system version, or individual product or protocol. Nonetheless, the disclosure of the standard or other professional literature defining the programming language, operating system, browser, system version, or individual product or protocol in question, is incorporated by reference herein in its entirety.

Elements separately listed herein need not be distinct components and alternatively may be the same structure. A statement that an element or feature may exist is intended to include (a) embodiments in which the element or feature exists; (b) embodiments in which the element or feature does not exist; and (c) embodiments in which the element or feature exist selectably e.g. a user may configure or select whether the element or feature does or does not exist.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor/s may be employed to compute or generate or route, or otherwise manipulate or process information as described herein and/or to perform functionalities described herein and/or to implement any engine, interface or other system illustrated or described herein. Any suitable computerized data storage, e.g. computer memory, may be used to store information received by or generated by the systems shown and described herein. Functionalities shown and described herein may be divided between a server computer and a plurality of client computers. These or any other computerized components shown and described herein may communicate between themselves via a suitable computer network.

The system shown and described herein may include user interface/s e.g. as described herein which may for example include all or any subset of: an interactive voice response interface, automated response tool, speech-to-text transcription system, automated digital or electronic interface having interactive visual components, web portal, visual interface loaded as web page/s or screen/s from server/s via communication network/s to a web browser or other application downloaded onto a user's device, automated speech-to-text conversion tool, including a front-end interface portion thereof and back-end logic interacting therewith. Thus the term user interface or "UI" as used herein includes also the underlying logic which controls the data presented to the user e.g. by the system display and receives and processes and/or provides to other modules herein, data entered by a user e.g. using her or his workstation/device.

BRIEF DESCRIPTION OF THE DRAWINGS

Certain embodiments of the present invention are illustrated in the following drawings; in the block diagrams, arrows between modules may be implemented as APIs and any suitable technology may be used for interconnecting functional components or modules illustrated herein in a suitable sequence or order e.g. via a suitable API/Interface. For example, state of the art tools may be employed, such as but not limited to Apache Thrift and Avro which provide remote call support. Or, a standard communication protocol may be employed, such as but not limited to HTTP or MQTT, and may be combined with a standard data format, such as but not limited to JSON or XML.

Methods and systems included in the scope of the present invention may include any subset or all of the functional blocks shown in the specifically illustrated implementations by way of example, in any suitable order e.g. as shown. Flows may include all or any subset of the illustrated operations, suitably ordered e.g. as shown. Tables herein may include all or any subset of the fields and/or records and/or cells and/or rows and/or columns described. Specifically:

FIGS. 2a, 2b, 3, 4 illustrate embodiments of the present invention; all or any subset of illustrated elements may be provided, or known alternatives thereto.

Figure 1:
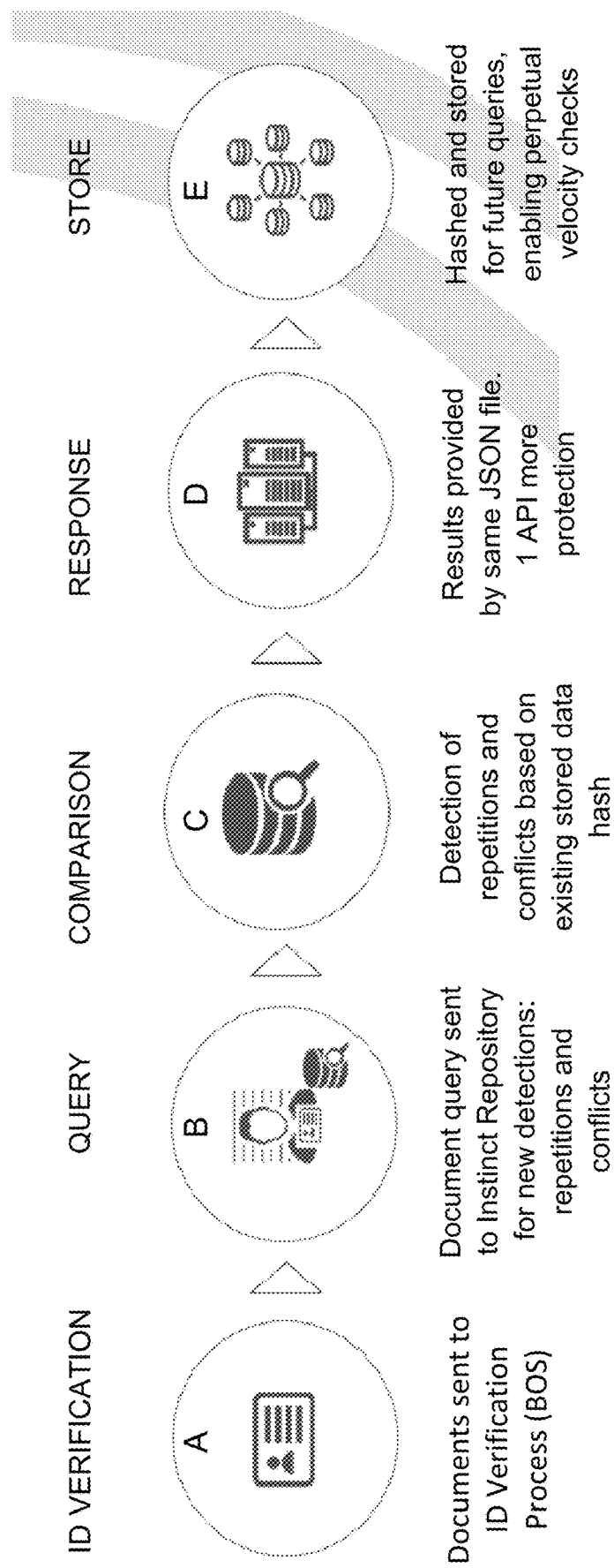
FIG. 1 is a simplified semi-pictorial illustration of a process, which may be performed when onboarding each individual new client in a flow of new clients; all or any subset of its operations may be performed in any suitable order e.g. as illustrated.

Computational, functional or logical components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs, and may originate from several computer files which typically operate synergistically.

Each functionality or method herein may be implemented in software (e.g. for execution on suitable processing hardware such as a microprocessor or digital signal processor), firmware, hardware (using any conventional hardware technology such as Integrated Circuit technology), or any combination thereof.

Functionality or operations stipulated as being software-implemented may alternatively be wholly or fully implemented by an equivalent hardware or firmware module, and vice-versa.

Firmware implementing functionality described herein, if provided, may be held in any suitable memory device, and a suitable processing unit (aka processor) may be configured for executing firmware code. Alternatively, certain embodiments described herein may be implemented partly or exclusively in hardware, in which case all or any subset of the variables, parameters, and computations described herein may be in hardware.

Any module or functionality described herein may comprise a suitably configured hardware component or circuitry. Alternatively or in addition, modules or functionality described herein may be performed by a general purpose computer, or more generally, by a suitable microprocessor, configured in accordance with methods shown and described herein, or any suitable subset, in any suitable order, of the operations included in such methods, or in accordance with methods known in the art.

Any logical functionality described herein may be implemented as a real time application, if and as appropriate, and which may employ any suitable architectural option, such as but not limited to FPGA, ASIC or DSP, or any suitable combination thereof.

Any hardware component mentioned herein may in fact include either one or more hardware devices e.g. chips, which may be co-located or remote from one another.

Any method described herein is intended to include within the scope of the embodiments of the present invention also any software or computer program performing all or any subset of the method's operations, including a mobile application, platform or operating system e.g. as stored in a medium, as well as combining the computer program with a hardware device to perform all or any subset of the operations of the method.

Data can be stored on one or more tangible or intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

While fraud e.g. synthetic fraud is hard to eliminate entirely, certain embodiments are configured to detect such fraudsters' attempts to increase the credit available to them. Absent such a system, detection can occur with much delay.

The re-penetration attack e.g. using "Clone" or "Mutant" whitewashed ID images is one of the more prevalent and hard-hitting fraud techniques, especially against Customer-Not-Present services, where customer onboarding and risk mitigation are based on customer-submitted images of ID documents. Multiple attack cases have been reported, using high quality fake or counterfeit ID images, or banking, or relying on images submitted before the service provider has been properly protected. In typical cases, such attacks were discovered by chance, due to an alert professional with good memory, or after 30-40 accounts were opened based on "clones" or "mutants", and fraud has already been committed on a significantly damaging scale.

Certain embodiments include a platform which may be global cloud-based, and/or may include machine learning and/or may provide I.D. verification and authentication, and/or may include functionality, e.g. an associated platform, which may be autonomous and may be anonymous.

Certain embodiments are configured to provide a platform providing a business community e.g. a network of participating organizations with global identity signals that can fight synthetic identity fraud.

The platform described herein typically pairs select signals with adaptive analytics to detect and share identity risk based on historical behaviors, emerging patterns and facts across a network of participating organizations.

The platform herein facilitates detecting criminal attempts to create multiple accounts, using fraudulent ID credentials that may have already penetrated one organization's system without detection. Organizations served by the platform may each provide their end-users with Customer-Not-Present (or customer present) services. Typically, the organizations' customer onboarding and/or risk mitigation are based on customer-submitted images of ID documents.

The platform facilitates collective detection of such criminal attempts, since typically, fraudsters, e.g. synthetic fraudsters, penetrate one system, and other systems. The platform herein, aka Instinct, typically leverages signals from one node [e.g. organization] to detect similar patterns across all other nodes on the network. Typically, the platform allows organizations to participate as an isolated node or (e.g. selectably) as an anonymous node within the ecosystem.

Anonymously shared data may be used to generate insights which may be based on different customers' identities.

The platform facilitates reducing the percentage of synthetic fraud attempts which go undetected. The platform may include a collaborative alert system. For example, a fraudster may slip by one organization's fraud rules. Using the platform herein, when the fraudster is seen again, the platform typically flags that event, alerts all nodes on the participating network, and thereby facilitates business workflows which block further fraud with that identity.

The platform may provide all or any subset of the following functionalities: Seen That Doc number, Seen That person, Seen That geoLocation, Seen That Image Template, Seen That Face, Seen That Address.

Certain embodiments are configured to provide a shared, anonymous collaboration data platform that provides shared insights based on different customers' data.

Certain embodiments are configured to provide a system aka Instinct allowing end-users to integrate with any suitable onboarding automation system having some or all of the capabilities e.g. authentication and/or content retrieval and/or verification/screening (KYC/AML) of AU10TIX service Back Office Service (BOS) which is referred to herein in various contexts merely by way of example.

Instinct or AU10TIX Instinct is used herein as shorthand to refer to an adaptive analytics and data platform according to certain embodiments e.g. as described herein. Instinct is aimed at detecting criminal attempts to create multiple accounts using fraudulent ID credentials that have already penetrated the service provider's system. Such attacks may be carried out using the same "cleared" credentials ("clones"), or such submitted with slight alterations ("mutants").

The REST (e.g.) API of the BOS (or other on-line service providing online ID authentication based on customer-scanned original ID documents) may use a suitable cryptographic protocol such as for example Transport Layer Security (TLS). HTTPS is an example protocol which may be used for connecting to the API.

Typically, setup of the system described herein includes configuring a secured transmission of information between ends. For example, BOS REST API uses one of the following two secured transmission schemas:

Client certificate

JSON Web Token (JWT)—which also uses a certificate indirectly.

In fact, both use a client certificate: the first one—directly, the second one—by signing the JWT by the private key of the client certificate. In B2B architecture, both schemas may be used.

Typically, a system such as the AU10TIX BOS onboarding automation service, handles authentication, content retrieval, and verification/screening (KYC/AML) of new clients identity risk based image processing. A second line of defense may be provided by adding an Instinct service, which helps detect attempts to create additional criminal accounts, using a previously successfully penetrated ID credential. The system herein typically flags or alerts for potential risks of even the highest quality forged or counterfeit IDs which may be beyond the capability of the system to detect as an individual forgery, however, may be picked up by the system do to the seen-that elements described herein.

Once subscribed to the service, the existing AU10TIX's API may contain an additional element or virtual object termed herein "DataAnalyticsReport" that holds Risk Indicators that were raised by Instinct based on historical data search results.

Instinct Service Provides Flagging of Repetitions and/or Conflicts for Example all or any Subset of:
 have I seen this document number before?
 have I seen this person before?
 have I seen this geographical location before?
 have I seen this image template before?
 have I seen this face picture before?
 have I seen this address before?

Each of the above SeenThat elements may at least once compute "Attack Information".
 Attack info may include all or any subset of:
 Attack Size—number of items that belong to the same series of documents that composes the attack
 Attack Quality—the number of conflicts among the attack members
 Attack Ratio—the ratio between the number of conflicts in the documents that composes the attack divided by the number of documents that compose the attack
 attack magnitude—RED, YELLOW, GREEN Repetition is a counter that counts the number of instances of each SeenThat element or use case searched entity (doc number, person, geolocation) in the Instinct data repository. A repeated document may imply or be indicative of document abuse.

Conflict is an indication that may be raised when current documents conflict with historical data that exists in Instinct's data repository (e.g. Boolean indicator (true, false)).

Instinct typically captures the BOS verification results and archives the hashed data into an Operational data store (ODS). All PII data is hashed, no plain data is stored, and no image files are stored. Typically, the data is hashed and the hash may be stored as a vector; hashes of elements or entities may then be compared rather than comparing the elements or entities directly
 Querying historical data: during the document verification process, the BOS (or alternative thereto) sends a data comparison query to Instinct's analytics engine, Instinct gets the data, and searches its internal data store for matches where the comparison is typically conducted between hashes e.g. between vectors, and matches may constitute identical-ity between vectors. Typically a "match" is indicative of repeated data, such as the name Joe Brown, or a face, or a template, which repeats itself, for example, in ID documents having different document numbers and identical birthdates. When Instinct Finds Matches, Instinct Compares the Data with the Historical Data and Returns Either or Both of these Entities:

Repetition—risk indicator that holds the number of repeated occurrences.
Conflicts—risk indicator that indicates a mismatch between the data and the historical data.

FIG. 1 shows an example process, including stage of operation of all or any subset of which may be provided, which includes verification, analytics, detecting repetitions and/or conflicts, and storing to facilitate future checks.

When comparing the current document's data with historical data that is saved in the DB, Instinct may respond to all or any subset of the following questions, suitably ordered e.g. as shown:
 Have I seen this document before?
 Count historical repetitions for the same document number
 Compare document with historical data to detect conflicts
Document number may be defined as a unique combination of the country and (if applicable) state appearing on the ID document+document type+document number, e.g. Brazilian passport number 123456 or USA, state of NY driving license number 7654321. This alphanumeric information (and any other alphanumeric information on the document image) may be derived from the imaged document using OCR and/or any suitable technology e.g. as described herein or e.g. as per co-owned patent documents belonging to applicant, for reading alphanumerical information from images of ID documents.
 Have I seen this person before?
 Count historical repetitions for the same person
 Compare document with historical data to detect conflicts
Person is defined as a unique combination of country+first name+last name (of full name when applicable)+date of birth.
 Have I seen this geolocation before?
 Count historical repetitions for the same geographical location
Geolocation is a unique combination of latitude and longitude that was extracted from the image meta source when applicable e.g. Latitude": "S 22d 54m 10", Longitude": "W 47d 2m 11".
Typically, if the image meta source does not include the geolocation information,
 Instinct skips counting the geolocation repetition counter.
 Have I seen This Image Template before?
 Count historical repetitions for similar image templates
 Compare document with historical data to detect conflicts—same image template, different person
Similar Image template typically comprises an event when two image templates are visually close enough, using any suitable system definition for closeness.
 Have I seen This Face picture before?
 Count historical repetitions for similar face pictures
 Compare document with historical data to detect conflicts—same face, different person
Similar face pictures typically comprises an event when two faces are visually/biometrically close enough using any suitable system definition for closeness.
 Have I seen This Address before?
 Count historical repetitions for identical addresses.
 Address is defined as unique combination of all address fields: Country, State, City, Street, Street number, Postal code.
 Have I seen this repeating too often?
As a data platform, Instinct is typically very sensate to data quality in that Instinct may perform its comparison query only on valid values (not missing and readable). When one of the comparison values is missing or unreadable, Instinct may skip the comparison. This is in order to avoid false positive alerts.

Instinct service aggregates repetition counter3 into 3 time frames:
1. last hour—number of occurrences aka repetitions in the last 60 minutes
2. last day—number of occurrences in the last 24 hours
3. all data—all historical data that the Instinct data repository holds for this document entities.

The service may use a transaction start datetime (the time when a doc verification service (e.g. a given instance of an Au10tix doc verification service) started the verification process) as the reference.

Typically, the system provides an infrastructure for selectable participation in a global collaboration against fraud or data consortium. It is appreciated that fraud attacks take place globally, especially with online and mobile services. Fraudsters thus launch attacks spread across markets and geographies. The Instinct service seeks to work collaboratively, sharing awareness of threats that may have been detected or not detected by others, thus providing preemptive ability to curb threats which have hit another entity. Typically, the Instinct service group members are configured for empowering each other by sharing detected threats, (e.g. in a hashed or otherwise anonymized manner, while protecting privacy and meeting regulatory requirements e.g. re privacy), e.g. through the data consortium. Thus a risk case detected by one group member may help flag that risk when encountered by another group member.

Typically, Instinct service taps to the accumulated inputs of all customers or users of instances of the system herein. Once an Instinct user submits an entry to the data consortium, the service carries out a real-time search, looking for repetitions and conflicts associated with the same data.

The system of the present invention may provide authentication e.g. via a network providing data communication between the system and digital service providers aka system users each having end-users. The system users may constitute a consortium. The consortium may for example include a data repository e.g. blockchain stored in computer memory, which typically includes plural records or blocks, and which is typically open or accessible to plural digital service providers each having end-users and each typically having end-user authentication functionality, thereby to allow the plural digital service providers to collaborate, e.g. relying on each others' previous interactions with end-users, for example for seen-that before elements described herein. This enhances quality of and/or reduces cost of end-user authentication (typically without placing any additional burden of creating a proprietary api or equivalent device) on the digital service providers' end users. The system may also comprise client side software typically residing in a hardware processor which may allow an individual digital service provider to add an individual transaction e.g. between the digital service provider and an end user of the provider, typically as a new record or block, to the data repository e.g. blockchain, thereby, typically, providing an end-user authentication network or consortium for digital service providers.

To enable rapid response, Instinct data servers may be deployed in plural cloud servers, and may be synced in near real time so that each data transaction from anywhere in the world is available for comparison in all regions.

When Instinct replies with comparison results to the caller, risk indicators may be divided into the following two groups:

1. "My organization"—risk indicators that were found in an organization's historical transactions
2. "All"—risk indicators that were found with all historical transactions in all instances of the system herein which have opted to operate collaboratively.

Typically, by default, all customers are "opted out" of this service; in order to participate, the customer (e.g. user of the system herein) would then need to opt in.

The BOS (or alternative) system's response for subscribed customers may include all or any subset of high level elements which may, for example be represented in JSON.

The tables of FIGS. 2a-2b show internal data attributes and enumerations/codes, all or any subset of which may be used by Instinct.

Referring again to FIG. 1, the process typically includes, for each new client, all or any subset of the following operations, in any suitable order e.g. as follows:

Operation A. accepting an image of the client's ID where the ID typically has a document number, photo of the person, and (sometimes) a geo-location verification using, say, AU10TIX BOS onboarding automation service which includes authentication, content retrieval, and optional verification/screening (KYC/AML). Provide "verification results".

Operation B. Send query to Instinct repository to look for historical data indicators.

Operation C.i. Compute "repetition"-type risk indicator/s (aka risk indicator values), for this document number (where each "document number" includes, say, all or any subset of country/state/document type and number e.g.). A counter typically comprises the number of instances of this document number, in the Instinct data repository, found by comparing a hash of the onboarding document number, to the hashes of all document numbers in historical data e.g. in the Instinct data repository (either just this instance of Instinct which is serving a certain organization, or in any data repository of any participating or cooperating or collaborating Instinct data repository (i.e. of other organizations as well). Typically, the historical data within a certain window is what is examined for repetitions. Plural windows may be examined e.g. 3 windows which are 1 hour long, 1 day long, and a window extending from when this given instance of the Instinct system began operating, to the present time.

Operation C.ii. Compute "repetition"-type risk indicator/s, for this person (where each "person" includes, say, all or any subset of country, first/last name, birthdate. A counter typically comprises the number of instances of this person, in the Instinct data repository.

Operation C.iii. Compute "repetition"-type risk indicator/s, for geolocation (if any). An indicator typically comprises the number of instances of this geolocation, in the Instinct data repository, so the value of this counter is the number of images in the historical data, with the exact same geolocation.

The geolocation data may comprise GPS coordinates of where the image associated with the geolocation data was taken e.g. EXIF or Exchangeable Image File Format data. More generally, the data in the data repository/ies regarding a given image I may include any metadata generated and stored by the device which generated the image I, such as but not limited to EXIF data.

Operation C.iv. Compute "conflict"-type risk indicator, for this document number, typically true or false, where the indicator=true, if and only if data that is currently onboarding mismatches historical data e.g. the historical data includes a document with the same document number, but is different in other respects from the currently onboarding document e.g. has different personal data.

Operation C.v. Compute "conflict"-type risk indicator, for this person aka "person info" (e.g. country, first/last name, birthdate) is typically true or false, where the indicator=true, if and only if data that is currently onboarding mismatches historical data e.g. the historical data includes a document with the same person info, but is different in other respects from the currently onboarding document e.g. has a different document number.

Operation D. Generate a data analytics report e.g. onboarding service sends a query, aka "data comparison query" to analytics engine aka "Instinct", configured to generate a data analytics report (which may be returned via API between onboarding service and analytics engine) by computing risk indicators for this new client. Risk indicators may include repetitions and/or conflicts, e.g. may include all or any subset of:

Operation E. Storing data about this new client in a data repository, thereby to accumulate an "Instinct data repository" as more and more new clients are onboarded. This repository (aka "operational data store") typically comprises hashed BOS verification information and results and hashed PII data, e.g. hashes of, say, name, date of birth, passport or other document number, all of which may, if desired, be stored in a single record. According to certain embodiments, the data is stored as a JSON document.

Operation F. Implement the above indicators into the organization's business workflow or logic. For example, the workflow might include at least one rule which defines indicators of forgery. An example of indicators of forgery may be that a document a has the same document number (country, state, document type and document number e.g.) as at least one document/s b in a data repository, however document a's person data conflicts with the person data of document/s b. The workflow would then generate an alert that at least one of documents a and b, is/are forgeries. Typically, the workflow does not assume that conflict means a document is forged, since conflict merely indicates that the data on a current analyzed document is different from an earlier analysis done on the same document number or person (say).

It is appreciated that the above is merely exemplary and any other workflow and/or any other rules, which may be tailored to depend on different organizations' risk sensitivity and onboarding processes, may be applied to risk indicators (e.g. repetitions and/or conflicts) generated by any system, method and computer program product provided in accordance with embodiments described herein. For example, repetition indicators may be used for detecting behavior anomalies. An over-threshold or high number of repetitions per time window may be defined as a behavior anomaly which may be indicative of document abuse. Also, repetitions detected in cross-customers' data may be indicative of a scenario where a synthetic forger is trying to open multiple bogus accounts in multiple organizations. Rules, or thresholds for rules, may, for example, be developed using machine learning or classifiers.

Document conflict indication may be used for detecting actual document forgeries, although, generally, it is not the case that a document which has been seen before (in the historical data or data repository i.e.), with different data, is forged with certainty; instead the conclusion is that such a document is associated with a higher degree of forgery risk, than a document that has not been seen before with different data.

It is appreciated that in addition to or instead of risk indicators based on "have I seen this document/person/geolocation before?", other risk indicators may be computed e.g. "have I seen this image/face before?". Each face may be represented as a set of unique face identifiers, and face conflicts may be identified, if the historical data includes instances of that exact set of face identifiers, e.g. with different document data.

It is appreciated that the hash function may include any cryptographic function which may be applied to data from the data repository, thereby to generate a result, for which the data cannot be derived from the result, thereby ensuring privacy of the data from the repository.

It is appreciated that all data regarding each of the images may be hashed, or alternatively, only some of the data regarding each of the images may be hashed (e.g. sensitive data such as name, document number, photograph of document bearer), whereas other data regarding each of the images (e.g. data which is not sensitive, such as country/state/document type), may not be hashed.

An example design architecture and example API are now described in detail.

Figure 3:
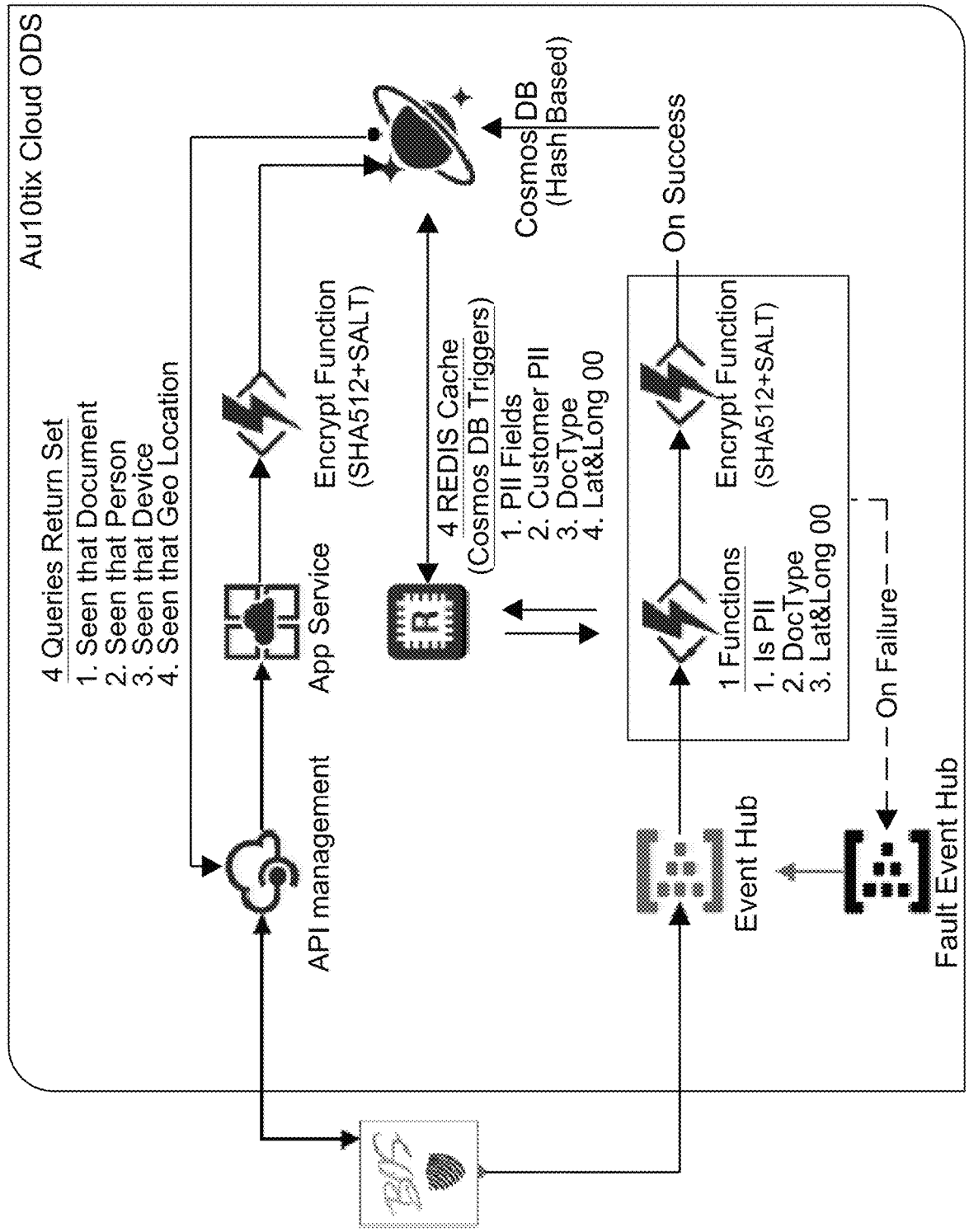

FIG. 3 illustrates specific modules and their high-level software architecture and design patterns. All or any portion of the features described herein may be employed.

Application Flow:
Data Insertion
    Data, e.g. JSON file/s, from Au10tix operational system may be processed by a server e.g. may be inserted into a queue in a server e.g. a cloud service (which may include infrastructure and resources to run applications) where it is processed
    1. Cache Check
    The Function first checks the REDIS tool that holds a distinct list of values and adds the new value in case it does not exists from the JSON file:
    PII Fields
    Customer IS PII—List of Customers that allow to process PII
    Encrypted data
    Document Type List—holds all the unique lists
    Zeroed Latitude and Longitude
    2. Checks if PII fields should be committed into the DB.
    3. Check if Document type exists in the collection.
    4. Zero's the 2 last digits of the Latitude and Longitude
    5. Encrypts the PII data into hash.
    1.1.1.1. API Query
        API Management
        APP Service—Is the backend service that prepares and optimizes the queries.
    Encryption Function—Since the data is encrypted in the Cosmos DB (Hash based) in order to compare, the function encrypts the "Where" clause for the query.

Figure 4:
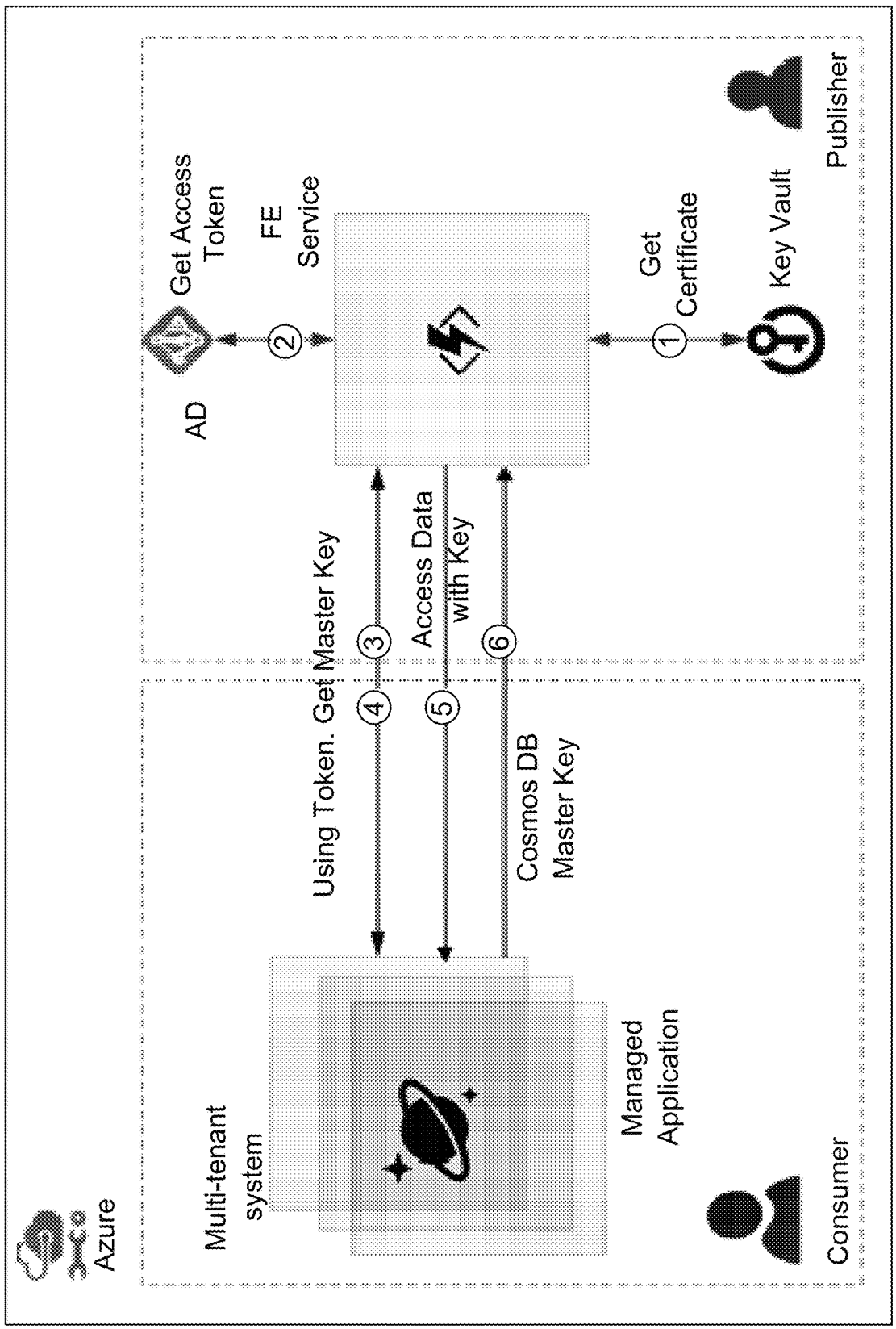

An example Storage Permissions scheme is shown in FIG. 4.

The Below Permissions Model is Useful to Facilitate Proper Handling of the Systems Data Structure:
    1.2. API QUERY Structure
Request
    Country
    State
    DocumentType
    DocumentNumberFirstName
    MiddleName
    LastName
    FullName
    DateOfBirth Latitude
Longitude
Face Identifier
ImageTemplate Descriptor
Address fields
Response
My organization
1.3. Query API Definitions
The Query API may include all or any Subset of the Following Repetition Type:
1. Seen That document number before
What is Document Number
Unique Document number is a unique combination of
Country
State
DocumentType
DocumentNumber
Info Fields
FirstName
MiddleName
LastName
FullName
DateOfBirth
FaceId
According to Certain Embodiments:
IndDocumentConflict gets one when all the ID fields are equals (Country+State+DocumentType+DocumentNumber) and one of the info fields values are different from the values that are stored in the DB.
All Document identifiers fields may be mandatory, the info fields are nullable.
Null values: the query may discard null values when looking for differences i.e. difference is defined when one or more fields that are not null are different from the values of the same field that is stored in the DB.
The Hour and Day counters may be based on ProcessingStartTime field
2. Seen That Person before
What is a Person
A unique person may comprise or may be a unique combination of person data which may include the following data or any suitable subset thereof:
Country
FirstName
LastName
DateOfBirth
Info Fields
DocumentType
DocumentNumber
Face Identifier
How to compare
Country—exact comparison
First Name—exact comparison
Last name—exact comparison
Date of Birth—year+month+day are identical
Face Identifiers similarity exceeds configurable similarity threshold
indPersonConflict gets one when all the ID fields+DocumentType are equal i.e using (Country+FirstName+LastName+DateOfBirth+DocumentType) and the DocumentNumber value is different from the value that is stored in the DB.
Null values: the query may discard null values when looking for differences i.e. difference is defined when one or more fields that are not null are different from the values of the same field that is stored in the DB.
The Hour and Day counters may be based on ProcessingStartTime field
3. Seen that GeoLocation before
What is a Geolocation
Unique geolocation may be a unique value of
Latitude
Longitude
How to compare
Latitude—exact comparison
Longitude—exact comparison
The Hour and Day counters may be based on ProcessingStartTime field
4. Seen that GeoLocation before
What is an Address
Unique address may be a unique value of
Country
State
City
Street
StreetNumber
Any suitable methods may be used to compare addresses. For example, comparisons may check if all fields of 2 addresses, e.g. all of the above, are identical.
According to certain embodiments, Hour and/or Day counters (for determining whether some element has been may be based on a ProcessingStartTime field.
5. Seen that Image Template before
What is an Image Template
A unique template may be a numerical representation of the visual elements of and image, including the visual element out of the document
Sample EntireImageTemplateDescriptor": "3947c2bc7c9d9b27, d10dbf1f8fc7e00c27ec3265adb83edb6d367b326dbc8f87c36db49a726d3c0e4f0361b41df9ad96cedc905f24d87649347f803c99256c96db0d9f231800e0703c989336"
Info Fields
FirstName
MiddleName
LastName
FullName
DateOfBirth
FaceIdentifier
Conflict indication may get true value when two or more image templates descriptors are close enough and the Info fields are different.
6. Seen that Face Picture before
What is a Face Picture
Face Identifier may be a numerical representation of the visual elements and biometrics of a human face.
Info Fields
FirstName
MiddleName
LastName
FullName
DateOfBirth
Conflict indication may get true value when two or more faces are similar enough and the Info fields are different.
Access to Cloud by BOS or equivalent
Flows may include:
1. The "Full Data" input from the BOS or equivalent; and/or
2. The "Analytics Query" input from the "BOS" or equivalent (e.g. Seen that Document, and/or Seen that Person and/or Seen that GeoLocation or any other SeenThat element).

The "Full Data" may be sent into a real-time data ingestion service and may enter a queue before digestion or ingestion.

The URI parameters may include all or any subset of:
ServiceBus Namespace
Event Hub name
Publisher name
Sender Key Name ("device" in our screenshot above)
Sender Key (the primary key from the shared access key generator section for the policy for "device"—see screenshot below)
Mode (HTTP or AMQP)—choose HTTP
TTL—because this key may sit on the device, a very long TTL may be set or a mechanism to update this SAS token may be implemented.

Example from GitHub:

```
private Task<HttpResponseMessage> PostTelemetryAsync(DeviceTelemetry deviceTelemetry)
{
    // Use Event Hubs Signature Generator 0.2.0.1 to generate the token
    // https://github.com/sandrinodimattia/RedDog/releases/tag/0.2.0.1
        // http://fabriccontroller.net/blog/posts/iot-with-azure-service-bus-event-hubs-authenticating-and-sending-from-any-type-of-device-net-and-js-samples/
    var sas = "SharedAccessSignature sr=YOUR TOKEN HERE";
    // Namespace info.
    var serviceNamespace = "YOUR NAMESPACE";
    var hubName = "YOUR HUB NAME";
        var url = string.Format("{0}/publishers/{1}/messages", hubName, deviceTelemetry.DeviceId);
    // Create client.
    var httpClient = new HttpClient
    {
        BaseAddress = new Uri(string.Format("https://{0}.servicebus.windows.net/", serviceNamespace))
    };
    var payload = JsonConvert.SerializeObject(deviceTelemetry);
    httpClient.DefaultRequestHeaders.TryAddWithoutValidation("Authorization", sas);
    var content = new StringContent(payload, Encoding.UTF8, "application/json");
    content.Headers.Add("ContentType", DeviceTelemetry.ContentType);
    return httpClient.PostAsync(url, content);
}
```

The "Analytics Query" input may be sent to a cloud service API, whereas the JSON "Full Data" may be sent to a real-time data ingestion service.

The fields to be included in the request may include required fields, which may for example include all or any subset of Country, State, DocumentType, DocumentNumber, FirstName, MiddleName, LastName, FullName, DateOfBirth, Latitude, Longitude, image template descriptor, face identifier, address fields The collaborative platform may comprise a community of digital service providers which each provide digital services to remote end-users, and which cooperate e.g. as described herein to yield more efficient authentication of end-users, as knowledge regarding known clients or end-users (e.g. whether certain end-users have been authenticated in prior transactions) and/or known digital service providers evolves with time. According to certain embodiments, a single authentication provider serves plural or all members of the community.

Figure 5:
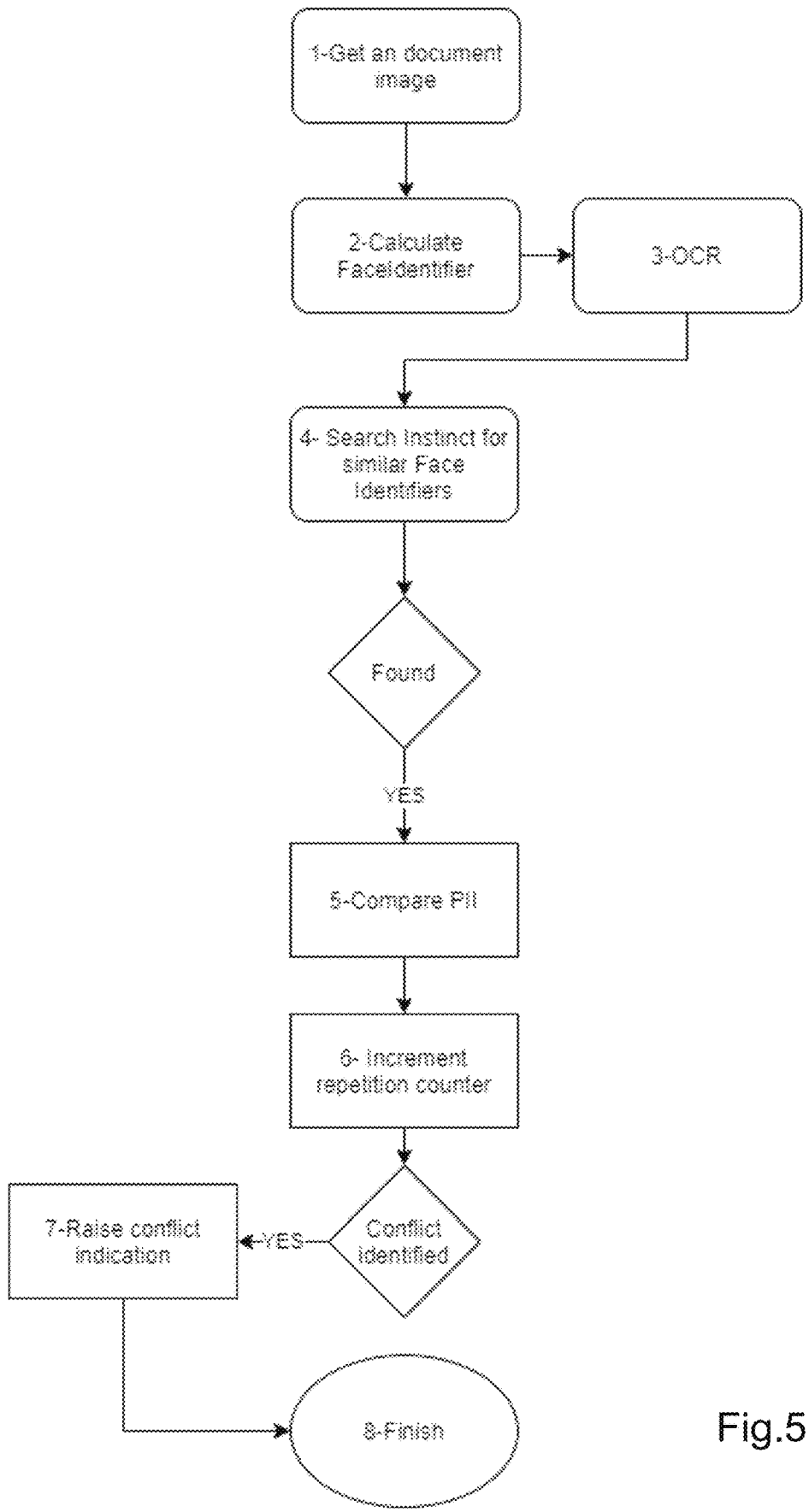
FIG. 5 is a simplified semi-pictorial illustration of a method or system flow for processing images of ID documents which include a photograph of a face which may or may not have been seen before; all or any subset of the method's operations may be performed in any suitable order, e.g. as illustrated.

FIG. 5 is a simplified flowchart illustration of a "Have I seen this face picture before" system flow, in accordance with certain embodiments; all or any subset of the illustrated operations may be provided, in any suitable order e.g. as shown.

The method of FIG. 5 may include all or any subset of the following operations, suitably ordered e.g. as follows:

FIG. 5, operation 1—get an ID image from a customer via Au10tix API

FIG. 5, operation 2—Compute faceIdentifier, numerical representation of the facial elements of the face picture found in the image sent by the customer FIG. 5, operation 3—Read the textual elements found in the documents, that includes PII and non PII information FIG. 5, operation 4—execute a query to Instinct Analytic database, which holds the historical data and its corresponding faceIdentifiers. The query searches for similar face identifiers using similarity algorithms and distance thresholds FIG. 5, operation 5—if similar faces found, compare the current doc PII with the PII extracted from Instinct FIG. 5, operation 6—when comparing the PII of similar faces, increment Instinct "have I seen this face pic before" repetition counters FIG. 5, operation 7—if conflict found in the PII of the current processed image and the data extracted from Instinct, raise "Have I seen that face pic before" conflict indication FIG. 5, operation 8—finish the process and reply the results in JSON format to the caller.

Figure 6:
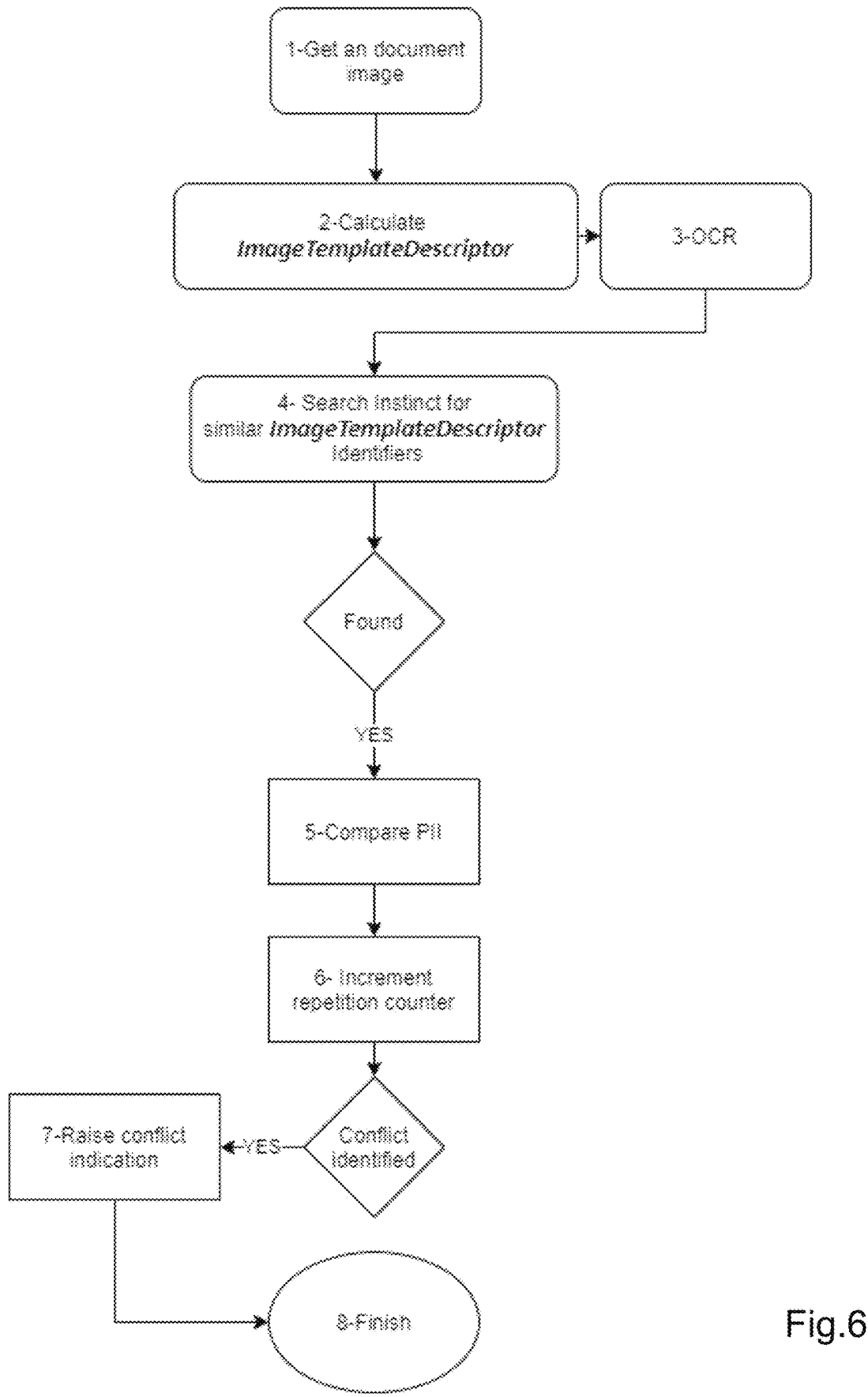
FIG. 6 is a simplified flowchart illustration of a "Have I seen this template before" method or system flow, in accordance with certain embodiments; all or any subset of the illustrated operations may be provided, in any suitable order, e.g. as shown.

FIG. 6 is a simplified flowchart illustration of a "Have I seen this template before" system flow, in accordance with certain embodiments; all or any subset of the illustrated operations may be provided, in any suitable order e.g. as shown.

FIG. 6, operation 1—get an ID image from a customer via Au10tix API

FIG. 6, operation 2—Compute ImageTemplateDescriptor, numerical representation of the visual found in the image send by the customer FIG. 6, operation 3—Read the textual elements found in the documents, that includes PII and non PII information FIG. 6, operation 4—execute a query to Instinct Analytic database, which holds the historical data and its corresponding ImageTemplateDescriptors. The query searches for similar image templates identifiers using similarity algorithms and distance thresholds FIG. 6, operation 5—if similar image templates are found, compare the current doc PII with the PII extracted from Instinct FIG. 6, operation 6—when comparing the PII of similar image templates, increment Instinct "have I seen this image templates before" repetition counters FIG. 6, operation 7—if conflict is found in the PII of the current processed image and the data extracted from Instinct, raise "Have I seen that image template before" conflict indication FIG. 6, operation 8—finish the process and reply the results in JSON format to the caller.

Data shared between digital service providers who are members of the system described herein may provide anonymized data regarding their would-be end-users (typically contingent on the end-users' having provided informed consent) to other members. Members may be connected to a point system, such that each authorization of use of data regarding a would-be end-user of theirs, rewards these members with points that may be redeemed in accordance with suitable logic e.g. if digital service provider x authorized use of data about 10 past would-be end users of theirs, digital service provider x is entitled to receive data about 10 new would-be end users of theirs, from other digital service providers.

The system serving the digital service providers may include a data repository e.g. blockchain stored in computer memory, which includes plural records or blocks, and which is typically open or accessible to plural digital service providers each having end-users and each having end-user authentication functionality, thereby to allow the plural digital service providers to collaborate, relying on each others' previous end-user authentications, enhancing quality of and/or reducing cost of end-user authentication on the digital service providers' end users); and client side software residing in a hardware processor which allows an individual digital service provider to add an individual transaction between the digital service provider and an end user of the provider, as a new record or block, to the data repository e.g. blockchain, thereby to provide an end-user authentication network or consortium for digital service providers.

The method of operation of the system herein may include providing data regarding an entity wherein the entity includes an ID document and a bearer thereof wherein the data includes data regarding the ID document and data regarding the bearer; and determining whether or not to authenticate the entity by applying logic to the data regarding the ID document and the data regarding the bearer. Typically, client side software allows an individual digital service provider to add an individual transaction between the digital service provider and an end user of the provider, as a new record or block, to the data repository e.g. blockchain, thereby to provide an end-user authentication network or consortium for digital service providers.

It is appreciated that the embodiments above are merely exemplary. More generally, a system may be provided which detects "attacks" on web-service providers who have subscribed to the system's platform. These attacks typically comprise an entire set (or stream over time) of forged ID documents which have something in common (some commonality) which is unlikely to be common to genuine ID documents streaming into the online presence of the web-service provider. For example, a single forger may "attack" a web-service provider (or more than one such) by uploading to the online presence of the web-service provider (or more than one such), dozens or hundreds of forged ID documents, which were generated by modifying a single genuine image of an ID document plus background, dozens or hundreds of times and uploading each of the resulting modified documents. The background may include portions of a hand holding the ID document, and/or of a surface e.g. desk on which the ID document has been laid; the desk may be clear or with a tablecloth or objects on it. To generate synthetic images of forged ID documents, a forger may generate dozens or hundreds of forged ID documents, perhaps by modifying a digital version of the ID document in the single genuine image, dozens of times, thereby yielding dozens of forged ID documents. Then, the forger may replace the ID document in the original genuine image, with each of the dozens of forgeries of that ID document, yielding dozens of ostensible images of ID documents—all on a wooden table at a certain angle, or all being held by the same hand, or having some other commonality. In the above example, what all the document images have in common, is that they have the same "template" (e.g. the image, other than the personal information and/or photo of the alleged bearer/owner of the ID document), is identical for all images). Sometimes, the images belonging to a single attack may have other commonalities, either in addition to or instead of having a single template. For example, images belonging to a single attack may all include a single photo of the alleged document bearer/owner, or may include different photos but some of the personal information is the same for all documents in the attack, and so forth.

Thus the system may be configured to count instances of a repeating ID number, perhaps zeroing the counter if a given time period such as a day, week or year has elapsed. Alternatively or in addition the system may be configured to count instances of a repeating "template" (background of a presented image of an ID card, including or not including the portions of the ID card which are common to all instances of that type of ID card—such as the background of the ID card which is common to all instances of, say, a series 3 driving license issued by country x, as opposed to the "name" of "birthdate" fields of the ID card which differ for different bearers of the ID card whose names and birth dates differ. Alternatively or in addition, the system may be configured to count instances of a repeating "person", where a person is defined in terms of his personal information such as name and/or birthdate and/or address. Alternatively or in addition, the system may be configured to count instances of a repeating face shown in the facial photograph field of the ID document in the document image.

It is appreciated that any suitable method may be used to compare a face shown in an incoming image document, to faces already known to the system and to output a binary or multi-value indication of whether or not the incoming face is identical to (belongs to the same person as) existing faces in the system which may have been recently presented (e.g. within a defined window of time). If so, the system may treat this as a repeating face; and if not, the system may not treat the face in the incoming image document as a repeat. For example, any conventional facial recognition algorithm may be employed for this purpose. For example, the following publication reviews such algorithms: "Facial-recognition algorithms: A literature review" by Paramjit Kaur et al, available online here: https://journals.sagepub.com/doi/abs/10.1177/0025802419893168.

Similarly, any suitable method may be used to compare templates of ID document images such as, for example using image comparison tools (e.g. as provided by Matlab or Python) to compare an incoming template with templates in the system which may have been recently presented (e.g. within a defined window of time).

According to certain embodiments, images of faces are not saved in the system. Instead, a string of numbers or other "face identifier", irreversibly derived from each face, e.g. by using a suitable hash function, is saved in the system, to ensure privacy of each system user's customers (end-users), and/or to ensure confidentiality of each system user's customer base. Then, comparisons to determine whether or not a face in a newly presented ID document image does or does not repeat certain faces known to the system (e.g. faces in ID document images encountered within a defined window of time), may include comparisons (typically binary e.g. yielding a result of identical or non-identical) between the respective strings of numbers derived from the faces.

According to certain embodiments, images of templates are not saved in the system. Instead, a string of numbers (or any other template descriptor) irreversibly derived from each template, e.g. by using a suitable hash function, is saved in the system, to ensure privacy of each system user's customers (end-users), and/or to ensure confidentiality of each system user's customer base. Then, comparisons to determine whether or not a template of a newly presented ID document image does or does not repeat templates of previously encountered document images (e.g. of ID document images encountered within a defined window of time), may include comparisons between the respective strings of numbers derived from the templates.

According to certain embodiments, personal information such as first name, last name, birth date, etc. are not saved in the system. Instead, a string of numbers irreversibly derived from each person's personal information, e.g. by using a suitable hash function, is saved in the system, to ensure privacy of each system user's customers (end-users), and/or to ensure confidentiality of each system user's customer base. Then, comparisons to determine whether or not personal information appearing in a newly presented ID document image does or does not repeat personal information appearing in previously encountered document images (e.g. of ID document images encountered within a defined window of time), may include comparisons between the respective strings of numbers derived from the personal information now being presented on the one hand, and instances of personal information that were presented, say, within the defined window of time such as within the last day, hour or year.

It is appreciated that the length of the window of time may differ over system users (may be a configurable parameter) and/or over criteria (e.g. may not be the same for template checks, face checks, and personal information checks. For example, if the system user is a fast-food provider, daily orders by the same person may be deemed perfectly reasonable and therefore, orders which are a day apart are not tallied. However, multiple orders of fast-food within a single hour are not reasonable and may be tallied. However, another system user may be a loan-provider. For that system user's end-users, daily loan requests by the same person are not reasonable, and nor are multiple loan requests within a single hour. More generally, the system may include data e.g. counters which as they are incremented provide an indication of the frequency or distribution over time with which certain document images are being presented to a web service which is a user of the system. This frequency or distribution may be compared to the characteristic or reasonable frequency for using that web service, and an alert may be provided regarding any accumulation of a presented document image which is unreasonable (e.g. exceeded a predetermined threshold). For example, the system may identify dozens of loan requests, ostensibly by a single individual, within a single day.

The system may also identify suspicious conflicts, where conflicts typically include two or N document images which are similar in some respects, but differ in other (or several other) respects. For example, an entire set of document images may each appear to be a bona fide image of an identity document. However, the system herein may detect that an incoming ID document image includes a unique document identifier (e.g. passport number) which has been "seen before" whereas the incoming ID document image's photograph and/or birthdate have not been seen before, suggesting that a forger may be using the same passport number for plural fictitious personas, as opposed to a passport number which has been legitimately seen before e.g. because the same person legitimately used the same web-service twice. Typically, if a presented document includes an aspect (e.g. document identifier or photograph of document bearer) which has been "seen before", other aspects of the document (e.g. birth date, first name, last name etc.) are compared, between the presented document and the document as seen before, to determine how many "conflicts" there are between the 2 documents. For example, if the birth date, first name and last name all differ, this may be considered a total of 3 conflicts between the 2 documents; a threshold number of conflicts, such as at least 3 or 7 or 10 conflicts, may be defined, over which the presented document may be flagged as suspect.

It is appreciated that an attack on a web service provider (or other organization) which is a user of the system herein, may include uploading plural ID document images which share a single template, and/or uploading plural ID document images which share a single ID document bearer's photograph and/uploading plural ID document images which share a single ID document identifier (aka docNumber) and/or uploading plural ID document images which share a single "person" (where a "person" may be identified, say, as a combination of first name, last name and birthdate. It is appreciated that repetitions of a template or bearer's photograph or docNumber or "people" may be checked by the system herein relative to, respectively, templates, bearer's photographs, docNumbers and/or "people" which have been presented to the web service provider itself. Alternatively, the system may check a ID document image just presented to system user x for repetitions, vis a vis templates, bearer's photographs, docNumbers and/or "people" which have been presented to any of the system's users. This may be done without compromising the confidentiality of each system user's client base e.g. as described elsewhere herein.

Hashes may be used with or without salting.

Certain embodiments seek to provide a system which identifies seen-that elements and identifies conflicting document images and derives therefrom information about attacks on the system, at least one attack typically including a set of document images wherein at least one seen-that element (e.g. as described herein) is common to all document images (e.g. images of ID documents) in the set, and yet, all or a subset of the document images are conflicting documents. Typically, the system derives from the information about attacks (aka attackInfo), indication/s of forged document/s including indicating at least one individual document image which is associated with an attack to be forged, because the individual document image belongs to a set of document images characterized by at least one seen-that element being common to all documents in the set. Typically, at least one forged document image is deemed forged by virtue of being associated with an attack, even if no evidence of forgery may be identified within the document image itself.

The input to these embodiments and indeed to any embodiment described herein may include at least one document image which is generated by an imager such as a camera (e.g. smartphone camera) or scanner. Since document images are typically generated remotely, hence without supervision by any entity or human operator trusted by the system, some document images may not be generated by imagers and rather may be forged e.g. may be image-processed to generate an image which resembles a document image actually generated by an imager.

The system shown and described herein is typically configured to link different conflicting documents into "Attacks", e.g. to identify a set of conflicting documents as an attack. A given attack may comprise a series or set of conflicting synthetic documents which have common attributes (attributes which are the same), and are typically generated by the same fraudster.

Attack attributes may for example include face picture, image template, document number, PII. Thus, there may be plural attack types which the system may recognize e.g. all or any subset of the following attack types:

Same face picture—the system may link and count all conflicting documents with the same face picture. Typically, "All conflicting documents" includes all documents since the system began working.

Image template—the system may link and count all conflicting documents with the same Image Template Document number—the system may link and count all conflicting documents with the same document number Person—the system may link and count all conflicting documents with the same PII Typically, conflicting documents include a pair (or more) of document images having one or more document fields which are in conflict, together with, typically, some documents fields that repeat. For example, in the "seen that face picture" use case conflicting documents may share the same face picture but may each have a different name.

Linking documents into an attack typically comprises assigning a unique "Attack id" (Unique identifier) to all documents that are part of (aka "belong to") an attack.

The system may also characterize attacks using all or any subset of the following:

Attack Size: the number of attack members; the documents that form the attack (aka belong to the same attack) or are members of the set of documents which conflict.

Attack quality: the number of conflicts among the attack members

Attack ratio: attack quality divided by attack size

Attack magnitude: for example, Green, Yellow, Red. Values or level typically are configurable per attack ratio and customer. This may determine risk assessment and decision making at least partly e.g. a document image found to belong to a red attack may be declined and blocked from completing customer onboarding.

Example Attack API Structure:

```
"AttackInfo": {
    "SeenThatPerson": {
        "Id": "ffe23f46-9b5f-11eb-a8b3-0242ac130066",
        "Size": 10,
        "Quality": 1,
        "Ratio": 0.1,
        "Magnitude": "Green"
    },
    "SeenThatDocumentNumber": {
        "Id": "ffe23f46-9b5f-11eb-a8b3-0242ac130055",
        "Size": 2,
```

-continued

```
        "Quality": 2,
        "Ratio": 1,
        "Magnitude": "Green"
    },
    "SeenThatImageTemplate": {
        "Id": "ffe23f46-9b5f-11eb-a8b3-0242ac130044",
        "Size": 7,
        "Quality": 3,
        "Ratio": 0.43,
        "Magnitude": "Yellow"
    },
    "SeenThatFacePicture": {
        "Id": "ffe23f46-9b5f-11eb-a8b3-0242ac130022",
        "Size": 10,
        "Quality": 14,
        "Ratio": 1.4,
        "Magnitude": "Red"
    }
}
```

Attacks may include 10 or 100 or 1000 or more image documents.

Typically although not necessarily, more than two documents with the same face picture but different names is enough to allow an attack to be flagged by the system e.g. by generating a new attack ID.

It is appreciated that embodiments herein are useful in allowing the system to decline customer onboarding even where the system cannot determine, from a given document image alone, that this image "is a forgery", yet can determine that the document image is part of an attack.

According to certain embodiments, attack information allows system users to go backward to earlier images already in the system, and have a policy that, for example, any user already stored in system memory (typically including a hash or other encryption function), who has the same face picture as the shared (i.e. in-common) face picture in a just-identified attack, is hereby marked as a suspect user, and no longer deserving of services.

And/or, any user already in the system, who has the same Image Template as the shared Image Template in a just-identified attack is hereby marked as a suspect user, and no longer deserving of services.

And/or, any user already in the system, who has the same document number as the shared document number in a just-identified attack is hereby marked as a suspect user, and no longer deserving of services.

And/or any user already in the system, who has the same PII as the shared PII in a just-identified attack, is hereby marked as a suspect user, and no longer deserving of services.

A hash or a hash or encryption function, e.g. on a template or face, for comparison with other hashes e.g. as described herein, may be computed for the entire image (say, for an image of a hand holding a passport over a table covered with a tablecloth)—for the entire image including hand, tablecloth, passport, and face) and/or a hash and/or a hash or other encryption function may be computed only for the background surrounding the passport, without the passport itself and/or only for the passport without the face and/or without PII.

It is appreciated that hashing photo-bearing ID documents or portions thereof, and then performing binary (identical/non-identical) comparisons of the hashes (e.g.) as described herein are sufficient to detect attacks, inter alia because the document images "belonging" to a given attack are very close to identical in certain respects, being software-generated identical copies in some respects—as opposed, for example, to several images of the same person acquired by photographing the same person several times or several images of the same ID document acquired by imaging the same document several times, which are not software-generated copies, and therefore typically cannot be usefully compared using merely a binary test. the documents "belonging" to a given attack are software-generated identical copies in some respects if, for example, the forger uses a single image of a hand holding an ID card many times, each time replacing the portion of the image which represents the ID card, with a different forged ID card, or, each time replacing the portion of the image which represents the face-photo on the ID card, with an imaged face of some other person. In these cases, all portions of the document images are identical, other than the portion representing the ID card (in the first instance), or, other than the portion representing the ID card's alleged bearer, in the second case.

An example "Seen that Template" method which includes identifying images of forged documents by generating a template descriptor aka image template descriptor for document images each having a template which includes portions (e.g. all portions) of the document image which are "impersonal" i.e. not particular to the document bearer typically including background peripheral to the image of the document, and comparing descriptors to one another to identify images having generally identical templates, thereby to provide a "seen that template" element which is indicative of possible forgery, is now described in detail.

Specifically, methods for identifying images of forged documents by comparing two partially similar images of two different documents are now described. The two documents captured in the images are identified as forged using any suitable criteria e.g. when the following conditions are detected simultaneously:
1. Sufficient visual similarity—the visual appearance of the two images is highly similar. The similar visual content may include the document captured in the image, the background, and the relations between the two.
2. Content difference—one or more of the personal identity details in the two documents are different. This may include for example the names, document numbers, dates, or the face images embedded in these documents.

There are various methods to identify suspected forgery by identifying sufficient (e.g. over threshold) visual similarity of the impersonal visual content in the two images such that it suggests, with high probability, that the two images were generate using the same forgery preparation process. As an example, the following method may be used in order to implement such a forgery detection method. The method may include all or any subset of the following operations, suitably ordered e.g. as follows:
1. Given two images of two documents respectively, all or any subset of the following processing operations may be performed, in any suitable order e.g. as shown, typically independently for each image:
a. Visually localize the document in the image, using any suitable neural-network-based object detection method such as, for example, the method described in "Object Detection with Deep Learning: A Review", by Zhong-Qiu Zhao and Peng Zheng and Shou-tao Xu and Xindong Wu—available online at https://arxiv.org/abs/1807.05511 (aka Zhao et al 2019) or alternatively image processing methods such as any of those described in co-owned U.S. Pat. No. 10,467,491, entitled "System And Method For Detecting Forgeries".

b. Classify the type of document in the image, typically using a neural-network-based visual classification method such as the method described in "Deep Convolutional Neural Networks for Image Classification: A Comprehensive Review" by Waseem Rawat, Zenghui Wang, Neural Computation (2017) 29 (9): 2352-2449, available online at: https://direct.mit.edu/neco/article/29/9/2352/8292/Deep-Convolutional-Neural-Networks-for-Image (aka Rawat and Wang 2017, or alternatively image classification method as described in any of the co-owned patent documents mentioned herein.
c. Retrieve a stored template of the classified document type, which contains stored locations of the personal details and of the face images, relative to document location and orientation.
d. Process images and hide personal information/details: for example, using the stored relative locations and the actual location of the document in the image, draw obscuring graphical elements which are recognizable and typically uniform for all document images, and typically uniform-color (e.g. black rectangles) on the image which cover or occlude the personal content, thus leaving only impersonal content exposed.

Figure 7A:
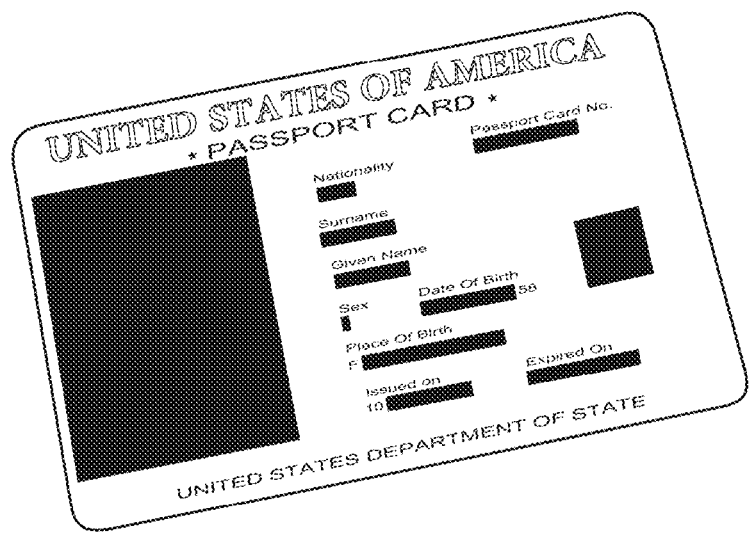
FIGS. 7a, 7b are example document images aka captured documents, which have been image-processed to redact or remove or obscure any portions of the image which are not impersonal, such as photographs and personal information regarding the bearer of the document.
Figure 7B:
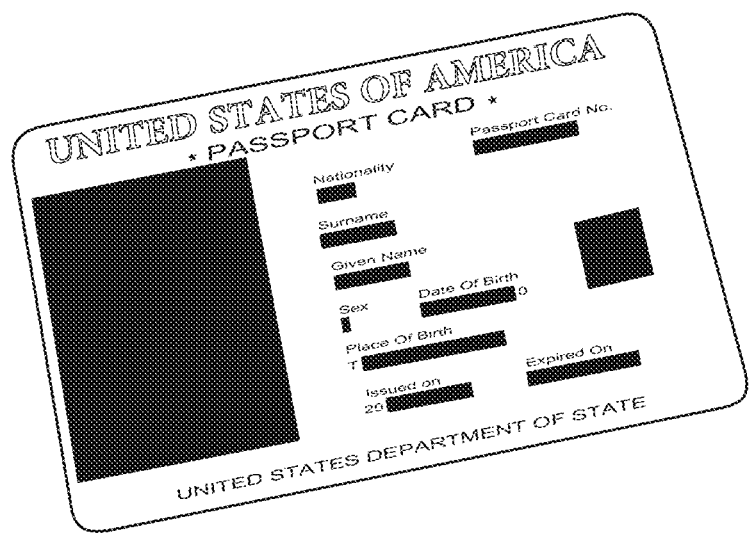

An example of the result of this process applied to two images of different forged documents is presented in FIGS. 7a-7b. Two images were generated by the same forgery agency and originally contained two different face photos and different personal details (not seen in the figure). The process described above covered these personal content fields with black rectangles, leaving the remaining content of the document and background visible. Results may look highly similar, but are not identical. For example, the black rectangles inaccurately located on the issue-date fields, expose the value 20 on the one document, and the value 10 on the other document. All content fields are originally different before covered.

e. Compute an "image descriptor" or "image hash" aka template descriptor or image template descriptor for the processed image, with hidden details. A variety of methods for computing image descriptors or hash values is known in the computer vision literature and community. For example the following methods implemented in the widely used computer vision software library OpenCV {{https://opencv.org/}} may be used: AverageHash, BlockMeanHash, DifferenceHash, MedianHash, PerceptualHash, WaveletHash, MarrHildrethHash. These methods are widely documented as part of OpenCV documentation; see e.g. https://docs.opencv.org/3.4/d4/d93/group_img_hash.html.

The result of applying such descriptor or hash computation is a small size vector of values which roughly represent the visual content of the image. For example, applying the PerceptualHash method for the two images in FIGS. 7a and 7b respectively computes the same vector a5962678c9c33739 in hexadecimal notation (equivalent to 64 bits), for both images. Identical or highly similar images typically have the same hash value, while the hash values of slightly different images may differ in some elements of the representation. typically but not necessarily, the hash may be applied to the entire processed image, including the background.
2. Given two such vectors (hash or, more generally, descriptors) of the two processed images, compute the similarity between the vectors. Any suitable similarity metric may be used, with respect to the selected hash or descriptor type. For example, one option is to measure the bitwise similarity, by counting the number of identical pairs of bits at corresponding locations of the two representations, typically after aligning the binary representations of the two vectors.
3. If the measured similarity, e.g. number of identical bits, between the vectors is higher than a predetermined threshold, the images are considered "sufficiently visually similar".
4. Use any type of OCR (Optical Character Recognizer) method to read a predetermined subset of the personal information textual fields (e.g. the name, number, etc.) from the two documents. Compare the read characters for pairs of corresponding fields from the two documents. If the number (or alternatively the fraction) of different characters is above a predetermined threshold, then the two documents are considered to have "different content". Using a threshold above zero allows some flexibility to avoid wrong decision following minor potential OCR errors.
5. If the documents were found to be "sufficiently visually similar" and have "different content", then they are both suspected to be forged.

Given a random selection of two images of identification documents from a large arbitrary collection of captured documents or document images, the probability of finding two images of different documents of the same type, located in front of identical backgrounds at the same positions and orientations is highly unlikely. Such event is much more likely to be the outcome of forgery preparations, when the same forgery agency uses the same document "template" (a document without personal content) which may be digitally rendered e.g. on the same location e.g. over the same artificial background image. The agency typically digitally renders or superimposes a requested face photo and requested personal details on the image of every forged document. Once these differentiating personal details are removed by the system herein e.g. using the black rectangles as described above, two documents that were forged in the same manner, may be detected as "sufficiently visually similar".

It is appreciated that if the background has no unique characteristics (e.g. It is an all-white wall or paper), especially if the document is located in a fully horizonal position and occupies most visual area of the image, the likelihood of finding two such different documents that are "sufficiently visually similar" when testing many pairs from a large enough collection of document images, becomes high, which may cause false alarms. To overcome this concern, a suitable filtering method may be used e.g. all or any subset of the following operations, suitably ordered e.g. as follows:

A. Measure and compute the ratio between the visual area of the background and the area of the document in the image. This may be done based on the results of the document localization operation 1a above.
B. Compute a measure of how visually rich is the content of the background. Any standard measure such as the entropy of the color histogram of the image may be used.
C. Compute the angle of the document in the image—how far it is from being fully horizontal.
D. If any of the below hold, avoid the forgery detection method with this document:
 a. Not enough background—the background ratio is below a predetermined threshold. If, in addition, the document angle is small (below a set value) and hence less informative, use a different, higher minimal threshold for the background size.
 b. Background is not sufficiently visually rich—the measure is below a predetermined threshold. If, in addition, the angle is small, use a different, higher minimal threshold for the richness measure.
 Other combinations of related conditions may also or alternatively be used to reduce risk of false forgery detection.

Alternatively or in addition, such risks may be reduced by applying the forgery detection method using more than one type of hash or descriptor function. Each hash has slightly different sensitivity to different visual aspects. If more than one hash indicates that two images are sufficiently similar, there is higher confidence that small, yet important, differentiating visual aspects in the images are not mistakenly ignored.

References herein to digital service providers may be replaced with references to web service providers or system users. References herein to system users may be replaced with references to digital service providers or web service providers. References herein to web service providers may be replaced with references to digital service providers or system users.

The term "BOS" as used herein is not intended to be limited to the Au10tix BOS platform and may for example be replaced by any other online service or platform, providing online ID authentication based on customer-scanned original ID documents with or without forensic-level ID authentication and/or multi-modal Selfie-to-ID face matching and/or other conventional KYC service/s.

In conjunction with any of the embodiments shown and described herein, it is appreciated that authentication of individual documents may be performed in accordance with any of the methods described in co-owned published PCT/IL2010/000933 or co-owned U.S. Pat. No. 9,081,988. Machined-learned based authentication may be employed e.g. as described in co-owned U.S. Pat. No. 9,406,030. Any suitable method may be used for detecting forgeries e.g. as described in co-owned U.S. Pat. No. 10,467,491. Forgeries may be detected on an individual document basis by analyzing JPEG images e.g. as described in published US application 20210065355, also co-owned. Document images comprising original scans of documents may be differentiated from images of documents that are not original scans e.g. as described in published PCT/IL2019/051182, also co-owned.

Co-owned patent documents U.S. Pat. No. 9,081,988 entitled "Computerized Authentication of Electronic Documents" and published PCT/IL2010/000933, entitled "Computerized Integrated Authentication/Document Bearer Verification System . . . " describe systems for deriving personal information from imaged documents; any embodiment therein may be employed here to derive personal information from an imaged ID document.

Typically, although not necessarily, when a hash computed from a just-presented ID document image is compared to stored hashes computed from previously encountered ID document images, in order to generate seen-that data, the seen-that function is defined as "yes" if the 2 hashes (the outputs of the 2 respective hash functions) are identical, and is defined as "no" otherwise.

The system herein may also provide ID document authentication according to any known methods, such as machine-learning based authentication as described in co-owned U.S. Pat. No. 9,406,030, entitled "System and Methods for Computerized Machine-Learning Based Authentication of Electronic Documents Including Use of Linear Programming for Classification".

It is appreciated that terminology such as "mandatory", "required", "need" and "must" refer to implementation choices made within the context of a particular implementation or application described herewithin for clarity and are not intended to be limiting, since, in an alternative implementation, the same elements might be defined as not mandatory and not required, or might even be eliminated altogether.

Components described herein as software may, alternatively, be implemented wholly or partly in hardware and/or firmware, if desired, using conventional techniques, and vice-versa. Each module or component or processor may be centralized in a single physical location or physical device, or distributed over several physical locations or physical devices.

Included in the scope of the present disclosure, inter alia, are electromagnetic signals in accordance with the description herein. These may carry computer-readable instructions for performing any or all of the operations of any of the methods shown and described herein, in any suitable order including simultaneous performance of suitable groups of operations, as appropriate. Included in the scope of the present disclosure, inter alia, are machine-readable instructions for performing any or all of the operations of any of the methods shown and described herein, in any suitable order; program storage devices readable by machine, tangibly embodying a program of instructions executable by the machine to perform any or all of the operations of any of the methods shown and described herein, in any suitable order i.e. not necessarily as shown, including performing various operations in parallel or concurrently rather than sequentially as shown; a computer program product comprising a computer useable medium having computer readable program code, such as executable code, having embodied therein, and/or including computer readable program code for performing, any or all of the operations of any of the methods shown and described herein, in any suitable order; any technical effects brought about by any or all of the operations of any of the methods shown and described herein, when performed in any suitable order; any suitable apparatus or device or combination of such, programmed to perform, alone or in combination, any or all of the operations of any of the methods shown and described herein, in any suitable order; electronic devices each including at least one processor and/or cooperating input device and/or output device and operative to perform, e.g. in software, any operations shown and described herein; information storage devices or physical records, such as disks or hard drives, causing at least one computer or other device to be configured so as to carry out any or all of the operations of any of the methods shown and described herein, in any suitable order; at least one program pre-stored e.g. in memory or on an information network such as the Internet, before or after being downloaded, which embodies any or all of the operations of any of the methods shown and described herein, in any suitable order, and the method of uploading or downloading such, and a system including server/s and/or client/s for using such; at least one processor configured to perform any combination of the described operations or to execute any combination of the described modules; and hardware which performs any or all of the operations of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any operation or functionality described herein may be wholly or partially computer-implemented e.g. by one or more processors. The invention shown and described herein may include (a) using a computerized method to identify a solution to any of the problems or for any of the objectives described herein, the solution optionally including at least one of a decision, an action, a product, a service or any other information described herein that impacts, in a positive manner, a problem or objectives described herein; and (b) outputting the solution.

The system may, if desired, be implemented as a network—e.g. web-based system employing software, computers, routers and telecommunications equipment, as appropriate.

Any suitable deployment may be employed to provide functionalities e.g. software functionalities shown and described herein. For example, a server may store certain applications, for download to clients, which are executed at the client side, the server side serving only as a storehouse. Any or all functionalities e.g. software functionalities shown and described herein may be deployed in a cloud environment. Clients e.g. mobile communication devices such as smartphones, may be operatively associated with, but external to the cloud.

The scope of the present invention is not limited to structures and functions specifically described herein, and is also intended to include devices which have the capacity to yield a structure, or perform a function, described herein, such that even though users of the device may not use the capacity, they are, if they so desire, able to modify the device to obtain the structure or function.

Any "if-then" logic described herein is intended to include embodiments in which a processor is programmed to repeatedly determine whether condition x, which is sometimes true and sometimes false, is currently true or false and to perform y each time x is determined to be true, thereby to yield a processor which performs y at least once, typically on an "if and only if" basis e.g. triggered only by determinations that x is true, and never by determinations that x is false.

Any determination of a state or condition described herein, and/or other data generated herein, may be harnessed for any suitable technical effect. For example, the determination may be transmitted or fed to any suitable hardware, firmware or software module, which is known or which is described herein, to have capabilities to perform a technical operation responsive to the state or condition. The technical operation may, for example, comprise changing the state or condition, or may more generally cause any outcome which is technically advantageous given the state or condition or data, and/or may prevent at least one outcome which is disadvantageous, given the state or condition or data. Alternatively or in addition, an alert may be provided to an appropriate human operator or to an appropriate external system.

Features of the present invention, including operations which are described in the context of separate embodiments, may also be provided in combination in a single embodiment. For example, a system embodiment is intended to include a corresponding process embodiment, and vice versa. Also, each system embodiment is intended to include a server-centered "view" or client centered "view", or "view" from any other node of the system, of the entire functionality of the system, computer-readable medium, apparatus, including only those functionalities performed at that server or client or node. Features may also be combined with features known in the art, and particularly, although not limited to, those described in the Background section or in publications mentioned therein.

Conversely, features of the invention, including operations, which are described for brevity in the context of a single embodiment or in a certain order, may be provided separately or in any suitable sub-combination, including with features known in the art (particularly although not limited to those described in the Background section or in publications mentioned therein) or in a different order. "e.g." is used herein in the sense of a specific example which is not intended to be limiting. Each method may comprise all or any subset of the operations illustrated or described, suitably ordered e.g. as illustrated or described herein.

Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, Smart Phone (e.g. iPhone), Tablet, Laptop, PDA, Blackberry GPRS, Satellite including GPS, or other mobile delivery. It is appreciated that in the description and drawings shown and described herein, functionalities described or illustrated as systems and sub-units thereof can also be provided as methods and operations therewithin, and functionalities described or illustrated as methods and operations therewithin can also be provided as systems and sub-units thereof. The scale used to illustrate various elements in the drawings is merely exemplary and/or appropriate for clarity of presentation and is not intended to be limiting.

Any suitable communication may be employed between separate units herein e.g. wired data communication and/or in short-range radio communication with sensors such as cameras e.g. via WiFi, Bluetooth or Zigbee.

It is appreciated that implementation via a cellular app as described herein is but an example, and, instead, embodiments of the present invention may be implemented, say, as a smartphone SDK; as a hardware component; as an STK application, or as suitable combinations of any of the above.

Any processing functionality illustrated (or described herein) may be executed by any device having a processor, such as but not limited to a mobile telephone, set-top-box, TV, remote desktop computer, game console, tablet, mobile e.g. laptop or other computer terminal, embedded remote unit, which may either be networked itself (may itself be a node in a conventional communication network e.g.) or may be conventionally tethered to a networked device (to a device which is a node in a conventional communication network or is tethered directly or indirectly/ultimately to such a node).

Any operation or characteristic described herein may be performed by another actor outside the scope of the patent application and the description is intended to include apparatus whether hardware, firmware or software which is configured to perform, enable or facilitate that operation or to enable, facilitate or provide that characteristic.

The terms processor or controller or module or logic as used herein are intended to include hardware such as computer microprocessors or hardware processors, which typically have digital memory and processing capacity, such as those available from, say Intel and Advanced Micro Devices (AMD). any operation or functionality or computation or logic described herein may be implemented entirely or in any part on any suitable circuitry, including any such computer microprocessor/s as well as in firmware or in hardware, or any combination thereof.

It is appreciated that elements illustrated in more than one drawing, and/or elements in the written description, may still be combined into a single embodiment, except if otherwise specifically clarified herewithin. Any of the systems shown and described herein may be used to implement or may be combined with, any of the operations or methods shown and described herein.

It is appreciated that any features, properties, logic, modules, blocks, operations or functionalities described herein which are, for clarity, described in the context of separate embodiments, may also be provided in combination in a single embodiment, except where the specification or general knowledge specifically indicates that certain teachings are mutually contradictory and cannot be combined. Any of the systems shown and described herein may be used to implement or may be combined with, any of the operations or methods shown and described herein.

Conversely, any modules, blocks, operations or functionalities described herein, which are, for brevity, described in the context of a single embodiment, may also be provided separately or in any suitable sub-combination, including with features known in the art. Each element e.g. operation described herein, may have all characteristics and attributes described or illustrated herein, or, according to other embodiments, may have any subset of the characteristics or attributes described herein.

The invention claimed is:

1. An ID document authentication method serving system users having remote, non-present end-users to be authenticated, the method comprising:

providing a platform communicating with the system users via a communication network, which receives ID document images provided to the system users by the system users' remote, non-present end-users to be authenticated, who captured or acquired said ID document images using imagers including smartphone cameras or scanners, thereby to define a multiplicity of images;

providing digital memory which stores data derived from the ID document images as received; and using a hardware processor to compare at least one incoming ID document image to said data in said digital memory, including determining whether at least one characteristic of said at least one incoming ID document image is a characteristic found within said data which is stored in said digital memory, said data being derived from the ID document images as received from the remote, non-present end-users to be authenticated, who captured or acquired said ID document images using the imagers including the smartphone cameras or the scanners; and to generate an alert for said at least one incoming ID document image which has the at least one characteristic of said at least one incoming ID document image which is found within said data which is stored in said digital memory, said data being derived from the ID document images as received from the remote, non-present end-users to be authenticated, wherein said at least one incoming ID document image includes an additional image, of a document and of at least one object external to the document, and wherein said characteristic of said at least one incoming ID document image which is found within said data which is stored in said digital memory, said data being derived from the ID document images as received from remote, non-present end-users to be authenticated, comprises a template which includes an image of said at least one object which is external to the document, and defining a template for each incoming ID document image, the method determines whether the template of at least one incoming ID document image has been seen by the system before by determining similarity between the at least one incoming ID document image including the additional image, and at least one of the ID document images in the digital memory, and the method compares the images in the digital memory with the additional image to detect conflicts in which plural documents all having a single template including the additional image and at least one of the images in the digital memory pertain to different people.

2. The method of claim 1 further comprising providing geolocation data, characterizing the image capturing device, and wherein a data repository stores data regarding said multiplicity of images, said data repository also includes geolocation data for at least some of the ID document images in the multiplicity of images.

3. The method of claim 2 wherein said generating inputs also comprises analyzing whether the geolocation data exists within the data regarding each of the multiplicity of images of ID documents.

4. The method of claim 3 wherein said providing geolocation data comprises deriving said geolocation data from at least one image.

5. The method of claim 1, wherein document data is provided which characterizes the document depicted in the additional image; and wherein person data is provided which characterizes a person who bears the document depicted in the additional image wherein at least some data regarding each of the ID document images is time-stamped and further comprising determining how many of at least one of said document data and said person data exist within a given window of time, and determining how many of at least one of said document data and said person data exist within each of plural windows of time.

6. The method of claim 1 wherein the method is operative in conjunction with plural data repositories storing respective multiplicities of images of ID documents and wherein said generating input comprises analyzing whether certain data exists within a set of images, including more than one of the multiplicities of images of ID documents, and wherein images (I) stored in a given repository from among the plural repositories are included in said set only if an end-user of the method, associated with the given repository, authorizes inclusion of the images (I) in the given repository in the set.

7. The method of claim 6 wherein data regarding each of the images in the set has been encrypted, by applying an encryption function, thereby to provide encrypted data regarding each of the images in the set, and wherein said analyzing whether certain data, D, derived from a received image, which exists within the set of images, includes applying the hash function to data D, thereby to provide encrypted data D, and comparing the encrypted data D to the encrypted data regarding each of the images in the set, thereby to yield analytics which is collaborative between the plural repositories, yet preserves privacy of data in the repositories.

8. The method of claim 5 further comprising deriving document data from the image.

9. The method of claim 5 further comprising deriving said person data from the image.

10. A computer program product, comprising a non-transitory tangible computer readable medium having computer readable program code embodied therein, said computer readable program code adapted to be executed to implement an ID document authentication method serving system users having remote, non-present end users to be authenticated, the method comprising:

providing a platform communicating with the system users via a communication network, which receives ID document images provided to the system users by the system users' remote, non-present end-users to be authenticated, who captured or acquired said ID document images using imagers including smartphone cameras or scanners, providing digital memory which stores data derived from the ID document images as received; and using a hardware processor to compare at least one incoming ID document image to said data in said digital memory, including determining whether at least one characteristic of said at least one incoming ID document image is a characteristic found within said data which is stored in said digital memory, said data being derived from the ID document images as received from remote, non-present end-users to be authenticated, who captured or acquired said ID document images using the imagers including the smartphone cameras or the scanners; and to generate an alert for said at least one incoming ID document image which has the at least one characteristic of said at least one incoming ID document image which is found within said data which is stored in said digital memory, said data being derived from the ID document images as received from remote, non-present end users to be authenticated, wherein said at least one incoming ID document image includes an additional image of a document and of at least one object external to the document, and wherein said characteristic of said at least one incoming ID document image which is found within said data which is stored in said digital memory, said data being derived from the ID document images as received from remote, non-present end-users to be authenticated, comprises a template which includes the image of said at least one object which is external to the document, and defining a template for each incoming ID document image, the method determines whether the template has been seen by the system before by determining similarity between the at least one incoming ID document image including the additional image, and at least one of the ID document images in the digital memory, and the method compares the images in the digital memory with the additional image to detect conflicts in which plural documents all having a single template pertain to different people.

11. An ID document authentication system serving system users having remote, non-present end-users to be authenticated, the system comprising:

a platform communicating with system users via a communication network, which receives ID document images provided to the system users by the system users' remote, non-present end-users to be authenticated, who captured or acquired said ID document images using imagers including smartphone cameras or scanners, digital memory which stores data derived from the ID document images as received; and a hardware processor configured to compare at least one incoming ID document image to said data in said digital memory, including determining whether at least one characteristic of said at least one incoming ID document image is a characteristic found within said data which is stored in said digital memory, said data being of derived from the ID document images as received from remote, non-present end-users to be authenticated, who captured or acquired said ID document images using imagers including the smartphone cameras or the scanners; and to generate an alert for at said least one incoming ID document image which has the at least one characteristic of said at least one incoming ID document image which is found within said data which is stored in said digital memory, said data being derived from the ID document images as received from the remote, non-present end-users to be authenticated, wherein said at least one incoming ID document image includes an additional image of a document and of at least one object external to the document, and wherein said characteristic of said at least one incoming ID document image which is found within said data which is stored in said digital memory, said data being derived from the ID document images as received from the remote, non-present end-users to be authenticated, comprises a template which includes the image of said at least one object which is external to the document, and defining a template for each incoming ID document image, the system determines whether the template has been seen by the system before by determining similarity between the at least one incoming ID document image including the additional image, and at least one of the ID document images in the digital memory, and the system compares the images in the digital memory with the additional image to detect conflicts in which plural documents all having a single template pertain to different people.

12. The system of claim 11 wherein said characteristic found within said data comprises a photograph of a face within in the incoming ID document image.

13. The system of claim 11 wherein said characteristic found within said data comprises an ID document identifier OCRed from the incoming ID document image.

14. The system of claim 11 wherein said characteristic found within said data comprises personal information OCRed from the incoming ID document image.

15. The system of claim 11 wherein said characteristic found within said data comprises an ID document identifier OCRed from the incoming ID document image.

16. The system of claim 11 wherein said characteristic found within said data comprises a template of the incoming ID document image, which includes only portions of the incoming ID document image which are common to plural ID documents held by plural respective bearers.

17. The system of claim 11 wherein said characteristic found within said data comprises a template of the incoming ID document image, which includes portions of the incoming ID document image other than the incoming ID document itself, aka background portions of the incoming ID document image.

18. The method of claim 1 wherein the at least one object which is external to the ID document includes at least portions of an object holding the document and/or a surface on which the document has been laid.

19. The system of claim 11 wherein the at least one object which is external to the ID document includes at least portions of a physical surface on which the ID document has been laid.

* * * * *